(12) United States Patent
White

(10) Patent No.: US 6,783,247 B2
(45) Date of Patent: Aug. 31, 2004

(54) LIFE-SIZE COMMUNICATIONS SYSTEMS WITH FRONT PROJECTION

(76) Inventor: Peter McDuffie White, 5711 Preston Oaks Rd., Apt. 1142, Dallas, TX (US) 75254

( * ) Notice: Subject to any disclaimer, the term of this patent is extended or adjusted under 35 U.S.C. 154(b) by 0 days.

(21) Appl. No.: 10/389,308

(22) Filed: Mar. 14, 2003

(65) Prior Publication Data

US 2003/0174292 A1 Sep. 18, 2003

Related U.S. Application Data

(60) Provisional application No. 60/383,848, filed on May 29, 2002, and provisional application No. 60/363,975, filed on Mar. 14, 2002.

(51) Int. Cl.[7] .................. G03B 21/14; G03B 21/28; G03B 21/00; G03B 21/56; G03B 31/00
(52) U.S. Cl. .................. 353/79; 353/77; 353/122; 353/98; 353/15; 359/460
(58) Field of Search .................. 353/31–34, 71–73, 353/78, 99, 15, 7, 8, 10–13, 28, 37, 30, 47, 50, 51, 69, 70, 77, 98, 122; 348/782–788, 794; 349/15, 5–9; 359/449, 454–460

(56) References Cited

U.S. PATENT DOCUMENTS

| | | | |
|---|---|---|---|
| 4,232,939 A | 11/1980 | Kikuchi | |
| 4,298,246 A | 11/1981 | Iwamura | |
| 4,309,073 A | 1/1982 | Nishimura et al. | |
| 4,339,183 A | * 7/1982 | Yamada et al. | ........ 353/78 |
| 4,558,922 A | 12/1985 | Smith | |
| 4,578,710 A | * 3/1986 | Hasegawa | ........ 348/782 |
| 4,732,441 A | 3/1988 | Cheng | |
| 4,738,522 A | 4/1988 | Lunde et al. | |
| 4,805,895 A | 2/1989 | Rogers | |
| 4,852,988 A | 8/1989 | Velez et al. | |
| 4,965,819 A | 10/1990 | Kannes | |

(List continued on next page.)

FOREIGN PATENT DOCUMENTS

| | | |
|---|---|---|
| WO | WO 94/30016 | 12/1994 |
| WO | WO 96/09722 | 3/1996 |
| WO | WO 97-11405 | 3/1997 |
| WO | WO 01/11880 | 2/2001 |

OTHER PUBLICATIONS

"Eye-to-Eye Contact for Desk-to-Desk Video Conferencing," IBM Technical Disclosure Bulletin, vol. 35, No. 2, Jul. 1992, pp. 316–318.

(List continued on next page.)

Primary Examiner—Russell Adams
Assistant Examiner—Andrew Sever
(74) Attorney, Agent, or Firm—Slater & Matsil, L.L.P.

(57) ABSTRACT

A communication system for allowing a user (1) located in an observation zone to communicate with a person using a remote system at a remote location is provided. The communication system comprises a projector (6), a front projection screen (7), a two-way mirror (2), and a camera (3). The projector (6) is adapted to output a projected image along an image beam path. The front projection screen (7) has a downward-facing projection surface located in a plane above the projector (6). The image beam path impinges upon and illuminates the downward-facing projection surface of the screen (7) during use of the system. The two-way mirror (2) is located adjacent to and at an angle relative to the projection surface such that when the projected image is displayed on the projection surface, the projected image is reflected to the observation zone. The camera (3) is located behind the two-way mirror (2), such that the two-way mirror (2) is located between the camera (3) and the observation zone.

30 Claims, 16 Drawing Sheets

U.S. PATENT DOCUMENTS

| | | | |
|---|---|---|---|
| 5,061,061 A | | 10/1991 | Robley et al. |
| 5,117,285 A | | 5/1992 | Nelson et al. |
| 5,194,955 A | | 3/1993 | Yoneta et al. |
| 5,221,937 A | | 6/1993 | Machtig |
| 5,255,028 A | | 10/1993 | Biles |
| 5,278,596 A | | 1/1994 | Machtig |
| 5,365,354 A | | 11/1994 | Jannson et al. |
| 5,373,333 A | * | 12/1994 | Kawada et al. ............. 353/122 |
| 5,438,357 A | | 8/1995 | McNelley |
| 5,473,469 A | | 12/1995 | Magocs et al. |
| 5,528,425 A | | 6/1996 | Beaver |
| 5,532,736 A | | 7/1996 | Kuriki et al. |
| 5,541,769 A | | 7/1996 | Ansley et al. |
| 5,550,754 A | | 8/1996 | McNelley et al. |
| 5,573,325 A | | 11/1996 | Lekowski |
| 5,609,939 A | | 3/1997 | Petersen et al. |
| 5,619,254 A | | 4/1997 | McNelley |
| 5,639,151 A | * | 6/1997 | McNelley et al. ............. 353/98 |
| 5,685,625 A | * | 11/1997 | Beaver ........................ 353/28 |
| 5,777,665 A | | 7/1998 | McNelley et al. |
| 5,782,547 A | | 7/1998 | Machtig et al. |
| 5,837,346 A | | 11/1998 | Langille et al. |
| 5,865,519 A | | 2/1999 | Maass |
| 5,890,787 A | | 4/1999 | McNelley et al. |
| 5,892,538 A | | 4/1999 | Gibas |
| 5,923,469 A | | 7/1999 | Machtig et al. |
| 5,953,052 A | | 9/1999 | McNelley et al. |
| 6,023,369 A | | 2/2000 | Goto |
| 6,042,233 A | | 3/2000 | Mihashi et al. |
| 6,042,235 A | | 3/2000 | Machtig et al. |
| 6,044,226 A | | 3/2000 | McWilliams |
| 6,104,424 A | | 8/2000 | McNelley |
| 6,137,526 A | | 10/2000 | Kakii |
| 6,243,130 B1 | | 6/2001 | McNelley et al. |
| 6,290,359 B1 | | 9/2001 | Shriver |
| 6,334,687 B1 | * | 1/2002 | Chino et al. ................... 353/79 |
| 6,412,955 B1 | * | 7/2002 | Han ........................... 353/122 |
| 6,421,174 B1 | | 7/2002 | Ooshima et al. |
| 6,481,851 B1 | | 11/2002 | McNelley et al. |
| 6,494,582 B2 | * | 12/2002 | Kim ............................ 353/74 |
| 6,520,647 B2 | * | 2/2003 | Raskar ........................ 353/70 |
| 6,568,812 B2 | * | 5/2003 | Magocs ....................... 353/42 |
| 6,598,976 B2 | * | 7/2003 | Westort et al. ................ 353/28 |
| 6,600,600 B2 | | 7/2003 | Chen |
| 2002/0054277 A1 | * | 5/2002 | Han ........................... 353/122 |
| 2003/0151726 A1 | * | 8/2003 | Perkins et al. ................ 353/37 |

OTHER PUBLICATIONS

Komatsu, T., et al., "41.2: Multiscreen Display Method for Expanding Stereoscopic Viewing Space," SID International Symposium—Digest of Technical Papers, US, Playa Del Rey, SID, vol. 24, May 16, 1993, pp. 905–908.

De Silva, L.C., et al., "A Multiple Person Eye Contact (MPEC) Teleconferencing System," Proceedings of the International Conference on Image Processing (ICIP), US, Los Alamitos, IEEE Comp. Soc. Press, Oct. 23, 1995, pp. 607–610.

* cited by examiner

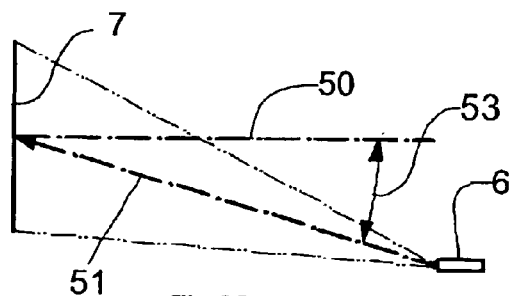
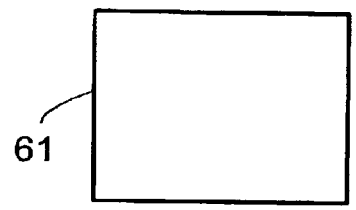
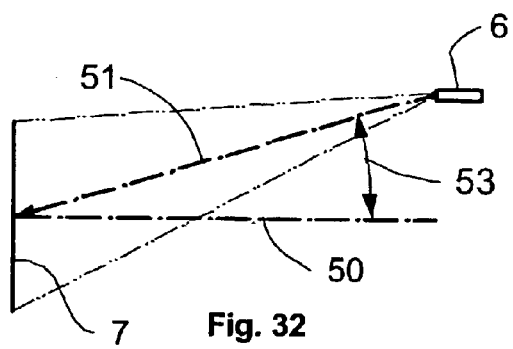
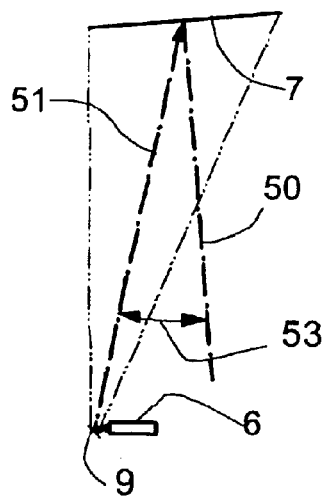
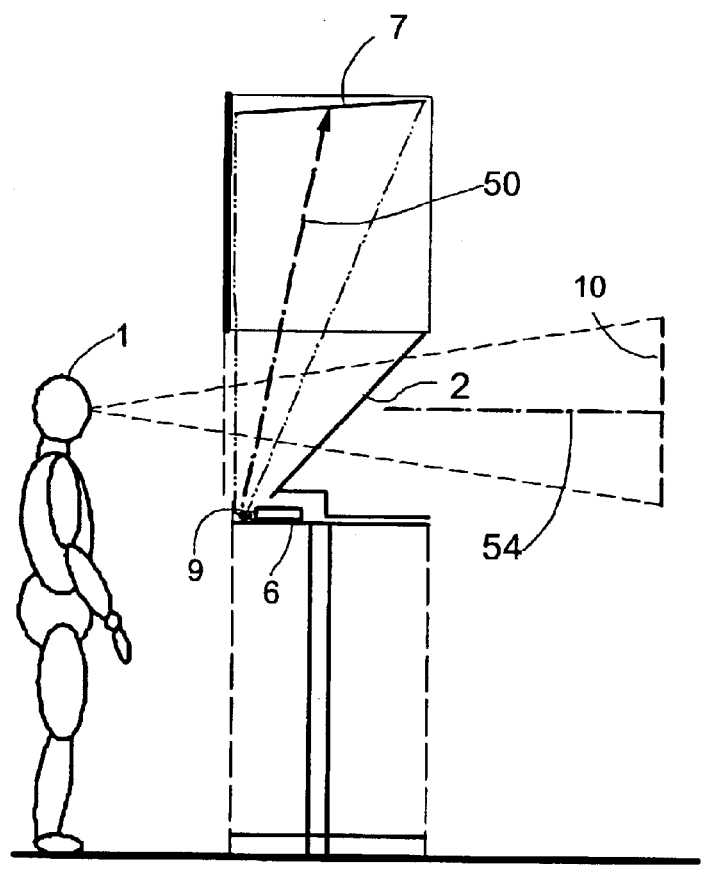
Fig. 30
Fig. 31
Fig. 32
Fig. 33
Fig. 34

LIFE-SIZE COMMUNICATIONS SYSTEMS WITH FRONT PROJECTION

This application claims priority to provisionally filed U.S. patent application Ser. No. 60/363,975 dated Mar. 14, 2002 and to provisionally filed U.S. patent application Ser. No. 60/383,848 dated May 29, 2002, which applications are incorporated herein by reference.

BACKGROUND OF THE INVENTION

1. Field of Invention

The invention relates generally to the display of video or computer generated images within a three dimensional volume of space through a configuration using a two-way mirror to superimpose an image displayed on a front projection screen with the potential of adding a camera in the line of sight of a life-size image of a person to achieve a perceived eye contact.

2. Description of Related Art

There is an increased need for advanced display systems that can improve communication through the display of prerecorded images that appear within a three dimensional setting for the purposes of advertising, product demonstrations, promotional activities, entertainment and various other applications. In addition to the display of prerecorded images, there is a need for displaying live images in the three dimensional setting for interacting with the imagery in real time.

The imagery to be displayed in the three dimensional setting may include prerecorded or live images of people at life-size or at a size appropriate to the purpose of the communication. For achieving lifelike interaction in real time, a camera can be placed in a position behind the plane of the appearance of the superimposed image within the three dimensional setting. By aligning the camera to the line of sight of the eye level of the generated life-size image, it is possible to achieve an apparent eye contact. This configuration has advantages over standard video conferencing, which does not achieve eye contact due to the placement of the camera above the displayed image of the person. With the economic conditions requiring cutbacks in travel budgets and the adverse effects of increased security to counteract terrorism, there is an increased need for an alternative to travel. This has generated a market need for systems that overcome the shortcomings of video conferencing, including providing eye contact and creating a greater sense of presence.

It has been shown in prior art as in FIG. 1 that a video image of a person can be viewed as a reflected image off a two-way mirror 2 with a camera 3 positioned behind the two-way mirror in a position that matches the eye level of the displayed person. This configuration can result in the appearance of eye contact with the person displayed on the video image. Communications systems with eye contact have included displays using CRT monitors 4 or rear projection systems. The size of the monitor 4 has required that embodiments in this configuration have been bulky making them undesirable for usage in many applications, such as typical office workspaces.

FIG. 2 shows prior art of a video phone illustrated in U.S. Pat. No. 5,194,955. This configuration demonstrates the usage of a flat panel display 5 with a line of sight that is matched to a camera 3 behind a two-way mirror 2. Even though flat panel displays minimize the bulk of a display system, they are very expensive for the size required to display a life-size image. This configuration results in the display of a flat image that will appear to be at the back of enclosure. For this reason this embodiment does not have the advantages of the appearance of images within the free space of a three dimensional setting.

Prior art U.S. Pat. Nos. 5,639,151 and 5,890,787 have attempted to resolve this issue by using a projector 6 to project an image through the two-way mirror 2 as illustrated in FIG. 3. The configuration does achieve a larger image than is practical with a flat panel display, but causes numerous undesirable visual effects. Firstly, the two-way mirror 2 by definition only allows a portion of light to be transmitted while the rest is reflected. As a result, only a portion of the light projected through the two-way mirror 2 will actually reach the front projection screen 7. Therefore, the brightness of the image on the front projection screen 7 is diminished, making the efficiency of the projection reduced. Secondly, a portion of the projected image is reflected off the two-way mirror 2 and shines directly into the lens of the camera 3. This is due to the requirement that the image of the person to be viewed on the front projection screen 7 must be aligned with the line of sight of the camera 3 in order to achieve the apparent eye contact. This alignment necessitates that the camera 3 will view the reflection of the projected image 32, which will cause a bright spot in the view to be transmitted to the person at the remote location and may cause a flare of light that would diminish the overall quality of the captured image. Thirdly, the projection of light on the two-way mirror 2 will brightly illuminate any dust or smudges on the glass surface of the two-way mirror 2. The consequence of this illumination of the surface of the glass is that the image captured by the camera 3 is illuminated with this unwanted distraction from the view through the two-way mirror. This problem is accentuated by the fact that the projected image must be bright to pass through the two-way mirror 2 and the camera 3 must be set to an open aperture to expose for the portion of light that will pass through the two-way mirror. Fourthly, the front projection surface 7 is in a direct line of sight 30 of the user 1, which is distracting from the intended purpose of making eye contact with the image displayed as the reflected image in the two-way mirror 2. Fifthly, the front projection screen 7 is facing upward toward overhead room lighting (not shown), which will wash out the image with light and diminish the overall quality of the displayed image. This is particularly critical for achieving the perception of the image of the person as appearing to be within the three dimensional volume of space. The incoming video signal of the person in the remote location should be an image of the person with the background dropped out to black. It is imperative that this black is maintained as the image is displayed on the screen so that the superimposed image shows the person without any light in the area of the background. Otherwise the rectangular frame of the screen will appear, which will break the illusion of the person being with the free volume of the three dimensional setting. It is for this reason that any light falling on the surface of the screen 7 must be avoided, which is difficult to achieve with this embodiment. Sixthly, the image displayed on screen 7 is viewed to appear behind the two-way mirror 2. Since there is equipment behind the two-way mirror 2 in the space where the reflected image would appear, it is not possible to view the image within a three dimensional setting. Therefore, the image generated by this invention is flat and does not have the potential to have the benefits of an image that appears to have three dimensional qualities in free space.

Prior art of patent WO97/11405 presents a configuration for theatrical production shown in FIG. 4, which illustrates the usage of a projection down onto a screen positioned on the floor. This shows the usage of a projected image in front of a two-way mirror 2, which is made from a thin semi-reflective film, instead of a semi-reflective sheet of glass. This configuration achieves a large image without the problems incurred by projecting through the two-way mirror. However, there is a major disadvantage of this configuration in that the front projection screen 7 is facing upwards to overhead lighting (not shown). While this may be acceptable in a theatrical application where the room lighting can be controlled, it would not be acceptable in an office environment or a normal public location where overhead lighting would be bright. Furthermore, the position of the screen surface 7 below the two-way mirror 2 places the image in a direct line of sight 30 of the viewer 1, which is distracting and takes away from the desired effect of creating the reflected image 10 appearing without revealing the source of the image.

Hence, there is a need for an improved system that addresses the shortcomings of the prior art mentioned above.

SUMMARY OF THE INVENTION

The problems and needs outlined above are addressed by the present invention. In accordance with one aspect of the present invention, an image projection system for displaying images to a user located in an observation zone is provided. The image projection system comprises a projector, a front projection screen, and a two-way mirror. The projector is adapted to output a projected image along an image beam path. The front projection screen has a downward-facing projection surface located in a plane above the projector. The image beam path impinges upon and illuminates the downward-facing projection surface of the screen during use of the system. The two-way mirror is located adjacent to and at an angle relative to the projection surface such that when the image from the projector is displayed on the projection surface of the screen, the image displayed on the screen is reflected to the observation zone.

In other embodiments of the present invention, the system may further comprise a reflective mirror positioned within the image beam path so that the projected image from the projector impinges the reflective mirror and is reflected upward onto the surface of the front projection screen, and the image beam path from the projector is substantially parallel with a horizontal plane. The angle of the reflective mirror relative to a horizontal plane may be about 45 degrees. The image beam path may be aimed directly at the projection surface of the front projection screen at an angle relative to a direction normal to the surface of the screen. The system may further comprise a baffle located between the observation zone and the front projection screen such that the projection surface of the screen is blocked from a field of view of the user located in the observation zone by the baffle. The system may further comprise a camera located behind the two-way mirror, such that the two-way mirror is located between the camera and the observation zone. During use of the system, the user has a line of sight aimed at eyes of a person in the image. The camera may be substantially aligned with the line of sight of the user so that when the user looks at the eyes of the person in the image, the user will also be looking into the camera. The system may further comprise a background surface having a low reflectivity and a dark color; the background surface being located below a back side of the two-way mirror and facing upwards generally towards the back side of the two-way mirror. The system may further comprise an illuminated three dimensional setting located behind the two-way mirror, such that the two-way mirror is located between the three dimensional setting and the observation zone. The three dimensional setting may comprise furniture, including but not limited to a chair, a lectern, at least part of a desk, and/or at least part of a table. From the observation zone, the image appears to be located in the context of the three dimensional setting.

The two-way mirror may be positioned at an angle of about 45 degrees relative to a horizontal plane. The screen surface may be substantially parallel to a horizontal plane. The system may be located on a shelf, located at a sales counter, located at a service counter, or located on a table, for example. The system may be located on a floor, and the system may be of a size adapted to display a life-size head-to-toe image of a person and/or a full-size image of a vehicle (e.g., car, truck, tractor, motorcycle, boat, jet ski, bicycle, etc.). The system may be located on a floor of a stage, and the projector may be located within the floor of the stage. The projector, the two-way mirror, and the front projection screen may be located within a free standing kiosk cabinet. The system may further comprise a speaker adapted to output sound to the observation zone. The system may further comprise a network connection (e.g., LAN, WAN, Internet, etc.) communicably coupling the image projection system to a remote system at a remote location. During use of the system, images presented to the user by the image projection system may comprise a life-size image of a person located at the remote location.

The system may be adapted to be foldable and portable. The system may further comprise means for aiding in transportation of the system, including but not limited to a pair of permanently attached wheels, a pair of detachable wheels, a permanently attached handle, a detachable handle, and/or a protective carrying case. The system may be adapted to be folded and concealed within furniture, including but not limited to a table, a desk, a shelving structure, and/or a counter.

The projection surface may be concave. The projector may use optical offsetting to correct for keystoning. The projector may be adapted to digitally distort the image before projection to adjust the image for corrected viewing of the image from the observation zone. The surface of the screen may be a lenticular reflective surface or a fresnel patterned reflective surface, for example. The system may further comprise a table, wherein the projector is attached to and located in the table. The system may further comprise a counter, wherein the projector is attached to and located in the counter. The system may further comprise a shelving structure, wherein the projector is attached to and located in the shelving structure. The two-way mirror may be a stretched sheet of mylar film having optical properties of partial reflection and transmission. The two-way mirror may comprise glass material, or plastic material, having optical properties of partial reflection and transmission. The two-way mirror may be any transparent substrate with a semi-reflective coating formed thereon and having optical properties of partial reflection and transmission. The system may further comprise a dark-colored and illuminated three dimensional setting located behind the two-way mirror that is visible from the observation zone. The projected image may comprise a black background behind an object, wherein the object does not extend beyond the borders of the projected image on at least three sides of the projected image so that the borders of the image are not noticeable to the user from the observation zone and so that the object in the projected image appears to be floating within a space behind the two-way mirror. The system may further comprise a camera located below and behind the two-way mirror; the camera being adapted to view the projection surface through the two-way mirror and an illuminated three dimensional setting located behind the two-way mirror as reflected from a back side of the two-way mirror.

In accordance with another aspect of the present invention, a communication system for allowing a user located in an observation zone to communicate with a person using a remote system at a remote location is provided. The communication system comprises a projector, a front projection screen, a two-way mirror, and a camera. The projector is adapted to output a projected image along an image beam path. The front projection screen has a downward-facing projection surface located in a plane above the projector, wherein the image beam path impinges upon and illuminates the downward-facing projection surface of the screen during use of the system. The two-way mirror is located adjacent to and at an angle relative to the projection surface such that when the projected image is displayed on the projection surface, the projected image is reflected to the observation zone. The camera is located behind the two-way mirror, such that the two-way mirror is located between the camera and the observation zone.

In other embodiments of the present invention, the communication system may further comprise a reflective mirror located between the projector and the observation zone, the reflective mirror being positioned within the image beam path so that the projected image from the projector impinges the reflective mirror and is reflected upward onto the surface of the front projection screen. The communication system may further comprise a baffle located between the observation zone and the front projection screen such that the projection surface of the screen is blocked from a field of view of the user located in the observation zone by the baffle. The communication system may further comprise a microphone adapted to receive sound from the observation zone and a speaker adapted to output sound to the observation zone. During use of the communication system, the user has a line of sight aimed at eyes of the remote person's image. The camera may be substantially aligned with the line of sight so that when the user looks at the eyes of the remote person's image, the user will also be looking into the camera. The communication system may further comprise an illuminated three dimensional setting located between the two-way mirror and the camera. The three dimensional setting may comprise furniture, including but not limited to a chair, a lectern, at least part of a desk, and/or at least part of a table. During use of the system, the remote person's image presented to the user located in the observation zone may comprise a life-size image of the remote person. The communication system may further comprise a network connection communicably coupling the communication system to the remote system at the remote location.

The communication system may be adapted to be foldable and portable. The communication system may be adapted to be folded and concealed within furniture, including but not limited to a table, a desk, a shelving structure, and/or a counter. The communication system may further comprise a background surface having a low reflectivity and a dark color, the background surface being located below a back side of the two-way mirror and facing upwards generally towards the back side of the two-way mirror. The projection surface may be concave. The projector may use optical offsetting to correct for keystoning. The surface of the screen may be a lenticular reflective surface or a fresnel patterned reflective surface, for example. The communication system may further comprise a table, wherein the projector is attached to and located in the table. The communication system may further comprise a counter, wherein the projector is attached to and located in the counter. The communication system may further comprise a shelving structure, wherein the projector is attached to and located in the shelving structure. The two-way mirror may be a stretched sheet of mylar film having optical properties of partial reflection and transmission. The two-way mirror may comprise a material having optical properties of partial reflection and transmission, including but not limited to glass, plastic, and/or any transparent substrate with a semi-reflective layer. The communication system may further comprise a dark-colored and illuminated three dimensional setting located behind the two-way mirror that is visible from the observation zone. The projected image may comprise a black background behind an object, wherein the object does not extend beyond the borders of the projected image on at least three sides of the projected image so that the borders of the image are not noticeable to the user from the observation zone and so that the object in the projected image appears to be floating within a space behind the two-way mirror. The communication system may further comprise an additional camera located below and behind the two-way mirror, the additional camera being adapted to view the projection surface through the two-way mirror and an illuminated three dimensional setting located behind the two-way mirror as reflected from a back side of the two-way mirror.

In accordance with still another aspect of the present invention, a communication system for allowing a user located in an observation zone to communicate with a person using a remote system at a remote location is provided. The communication system comprises an image projector, a front projection screen, a two-way mirror, a reflective mirror, and a camera. The image projector is positioned so that an image beam path projected from the projector is aimed in a direction towards the observation zone. The front projection screen is located above the projector so that the screen generally faces downward toward a ground surface and towards the image projector. The reflective mirror is located between the projector and the observation zone. The reflective mirror is also positioned at an angle relative to the ground surface, and within the image beam path so that the image beam path is reflected upward onto the front projection screen. The camera is aimed towards the observation zone. The two-way mirror is located between the camera and the observation zone. The two-way mirror has a first side facing generally towards the observation zone. The two-way mirror has a second side facing generally towards the camera. The two-way mirror is also positioned at an angle relative to the ground surface so that a bottom portion of the two-way mirror is located closer to the observation zone than a top portion of the two-way mirror. During use of the system, at least part of the first side of the two-way mirror is within a field of view of the user located in the observation zone. The projector, the image beam path, the reflective mirror, the front projection screen, and the two-way mirror are positioned relative to each other and relative to the observation zone such that when the system is in use, images in the image beam path from the projector are reflected from the reflective mirror to the screen, from the screen to the first side of the two-way mirror, and from the first side of the two-way mirror toward the user located in the observation zone.

In accordance with yet another aspect of the present invention, a communication system for displaying images of a remotely-located person to a user located in an observation zone and for allowing the user to visually and audibly communicate with the remotely-located person is provided. The communication system comprises a counter, an image projector, a front projection screen, a two-way mirror, a camera, a microphone, and a speaker. The counter located is adjacent the observation zone. The image projector is located at the counter. The projector is adapted to output a projected image along an image beam path. The front projection screen has a downward-facing projection surface located in a plane above the projector, wherein the image beam path impinges upon and illuminates the downward-facing projection surface of the screen during use of the system. The two-way mirror is located adjacent to and at an angle relative to the projection surface such that when the image from the projector is displayed on the projection surface of the screen, the image displayed on the screen is reflected to the user in the observation zone. The camera is located behind the two-way mirror, such that the two-way mirror is located between the camera and the observation zone, and the camera being adapted to receive an image of the user. The microphone is adapted to receive sound from the observation zone. The speaker is adapted to output sound to the observation zone.

In other embodiments of the present invention, the communication system may further comprise a shelving structure located below the counter and opening to the observation zone so that the user may access items on from the shelving structure while in the observation zone. The communication system may further comprise a reflective mirror located between the projector and the observation zone, the reflective mirror being positioned within the image beam path so that the projected image from the projector impinges the reflective mirror and is reflected upward onto the surface of the front projection screen. The communication system may further comprise a baffle located between the observation zone and the front projection screen such that the projection surface of the screen is blocked from a field of view of the user located in the observation zone by the baffle. The communication system may further comprise a shield located between the system and the observation zone. The projector may be attached to and located in the counter. The projection surface may be concave. The projector may use optical offsetting to correct for keystoning. The surface of the screen may be a lenticular reflective surface or a fresnel patterned reflective surface, for example.

The communication system may further comprise a dark-colored and illuminated three dimensional setting located behind the two-way mirror that is visible from the observation zone. The projected image may comprise a black background behind an object, wherein the object does not extend beyond the borders of the projected image on at least three sides of the projected image so that the borders of the image are not noticeable to the user from the observation zone and so that the object in the projected image appears to be floating within a space behind the two-way mirror. The communication system may further comprise a product dispensing device adapted to controllably output a product to the user in the observation zone. The communication system may further comprise a payment acceptance device adapted to receive payment from the user in the observation zone.

In accordance with another aspect of the present invention, a communication system for displaying images to a user located in an observation zone and for allowing the user to visually and audibly communicate with a remotely-located person is provided. The communication system comprises: a first shelving structure, a second shelving structure, an isle, an image projector, a front projection screen, a two-way mirror, a camera, a microphone, and a speaker. The first shelving structure is located adjacent the observation zone. The second shelving structure is located adjacent the first shelving structure. The isle is located between the first and second shelving structures. The image projector is located at the first shelving structure. The projector is adapted to output a projected image along an image beam path. The front projection screen has a downward-facing projection surface located in a plane above the projector, wherein the image beam path impinges upon and illuminates the downward-facing projection surface of the screen. The two-way mirror is located adjacent to and at an angle relative to the projection surface such that when the image from the projector is displayed on the projection surface of the screen, the image displayed on the screen is reflected to the user in the observation zone. The camera is located in the second shelving structure and behind the two-way mirror, such that the two-way mirror is located between the camera and the observation zone, and the camera being adapted to receive an image of the user. The microphone is adapted to receive sound from the observation zone. The speaker is adapted to output sound to the observation zone.

In other embodiments, the communication system may further comprise a shield located between the system and the observation zone. During use of the system, the image viewed by the user located in the observation zone may optically appear to be located within the isle. During use of the system, the user may have a line of sight aimed at eyes of a person in the image displayed by the system. The camera may be substantially aligned with the line of sight of the user, so that when the user looks at the eyes of the person in the image, the user will also be looking into the camera. The projector may be attached to and located in the shelving structure. The communication system may further comprise a product dispensing device adapted to controllably output a product to the user in the observation zone. The first shelving structure may have a first set of shelves opening to the observation zone and a second set of shelves opening to the isle.

In accordance with yet another aspect of the present invention, a foldable communication system for allowing a user located in an observation zone to communicate with a person using a remote system at a remote location, the system having a closed folded configuration and an operable unfolded configuration is provided. The foldable system comprises a base, an image projector, a two-way mirror, a front projection screen, a camera frame, and a camera. The image projector is attached to the base. The projector is adapted to output a projected image along an image beam path. The two-way mirror is pivotably coupled to the base and/or the projector. The front projection screen is pivotably coupled to the two-way mirror and/or the base. The front projection screen has a projection surface. The camera frame is pivotably coupled to the base. The camera is attached to the camera frame. In the operable unfolded configuration, the projector, the image beam path, the two-way mirror, the projection surface of the front projection screen, the camera frame, and the camera are positioned relative to each other and relative to the observation zone such that the front projection screen is located in a plane above the projector, the projection surface faces generally downward toward the base, the image beam path from the projector impinges upon and illuminates the projection surface of the screen during use of the system, the two-way mirror is positioned at an angle relative to the projection surface of the screen, the image displayed on the downward-facing projection surface of the screen is reflected off of the two-way mirror to the observation zone, and the camera is positioned to receive images of objects in the observation zone through the two-way mirror. In the closed folded configuration, the system occupies less space in at least one direction than when the system is in the operable unfolded configuration. The foldable communication system may further comprise a reflective mirror pivotably coupled to at least one of the base and the projector, wherein in the operable unfolded configuration, the reflective mirror is positioned within the image beam path so that the projected image from the projector impinges the reflective mirror and is reflected upward onto the surface of the front projection screen. The reflective mirror may be hinged directly to base, directly to the projector, or both. The base may be an integral part of a housing of the projector, or the base and the projector may be separable pieces. The foldable communication system may further comprise a baffle pivotably coupled to the screen, wherein in the operable unfolded configuration, the baffle is positioned at an angle relative to the screen. The foldable communication system may further comprise a camera reflective mirror pivotably coupled to the camera frame and/or the camera, wherein in the operable unfolded configuration, the camera reflective mirror being positioned at an angle relative to the camera so that the camera receives images from the observation zone via the camera reflective mirror. The camera frame may be an integral part of a housing of the camera, or the camera frame and the camera may be separable pieces. The two-way mirror may be hinged directly to base and/or directly to the projector. The screen may be hinged directly to two-way mirror and/or directly to the base.

The system may be portable in the closed folded configuration. The foldable communication system may further comprise means for aiding in transportation of the system, including but not limited to a pair wheels permanently attached to the base, a pair of detachable wheels adapted to be rotatably coupled to the base, a handle permanently attached to the base, a detachable handle adapted to be attached to the base, and/or a protective carrying case adapted to contain the remainder of the system therein, for example. The system may be adapted to be concealed within furniture when in the closed folded configuration. The furniture may be a table, a desk, a shelving structure, and/or a counter, for example.

In accordance with still another aspect of the present invention, an image projection system for generating a life-size image of an object within the context of an illuminated three dimensional setting as viewed from an observation zone is provided. The image projection system comprises a projector, a front projection screen, a two-way mirror, and a first camera. The projector is adapted to output a projected image along an image beam path. The front projection screen has a downward-facing projection surface located in a plane above the projector, wherein the image beam path impinges upon and illuminates the downward-facing projection surface of the screen during use of the system. The two-way mirror is located adjacent to and at an angle relative to the projection surface such that when the image from the projector is displayed on the projection surface of the screen, the image displayed on the screen is reflected to the observation zone, wherein the three dimensional setting is located behind the two-way mirror and the observation zone is located in front of the two-way mirror. The first camera is located below and behind the two-way mirror. The first camera is adapted to view the projection surface through the two-way mirror and the three dimensional setting reflected from a back side of the two-way mirror. The image projection system may further comprise a second camera located behind the two-way mirror, such that the two-way mirror is located between the second camera and the observation zone. The second camera is adapted to view the observation zone through the two-way mirror. The three dimensional setting may comprise a person, such that as viewed from the first camera and from the observation zone, the person and the object in the projected image appear within the same context within the three dimensional setting. The object in the projected image may be a prerecorded image of a person, a computer generated graphic, and/or a prerecorded animated image, for example.

BRIEF DESCRIPTION OF THE DRAWINGS

The above features of the present invention will be more clearly understood from consideration of the following descriptions in connection with accompanying drawings in which:

FIG. 30 illustrates a side view of a projection path of a projector with an off axis projection path with the projection path matching the angle of the off axis projection;

FIG. 31 illustrates a front view of a screen with a projection from a projector with an off axis projection with the projection path matching the angle of the off axis projection;

FIG. 32 illustrates the side view of the off axis projection with the projector flipped to angle the projected image downward;

FIG. 33 illustrates the projection path of FIG. 32 with a mirror added to direct the projection upward;

FIG. 34 illustrates the projection path of FIG. 33 positioned in an embodiment of the invention;

DETAILED DESCRIPTION OF THE PREFERRED EMBODIMENTS

Figure 1:
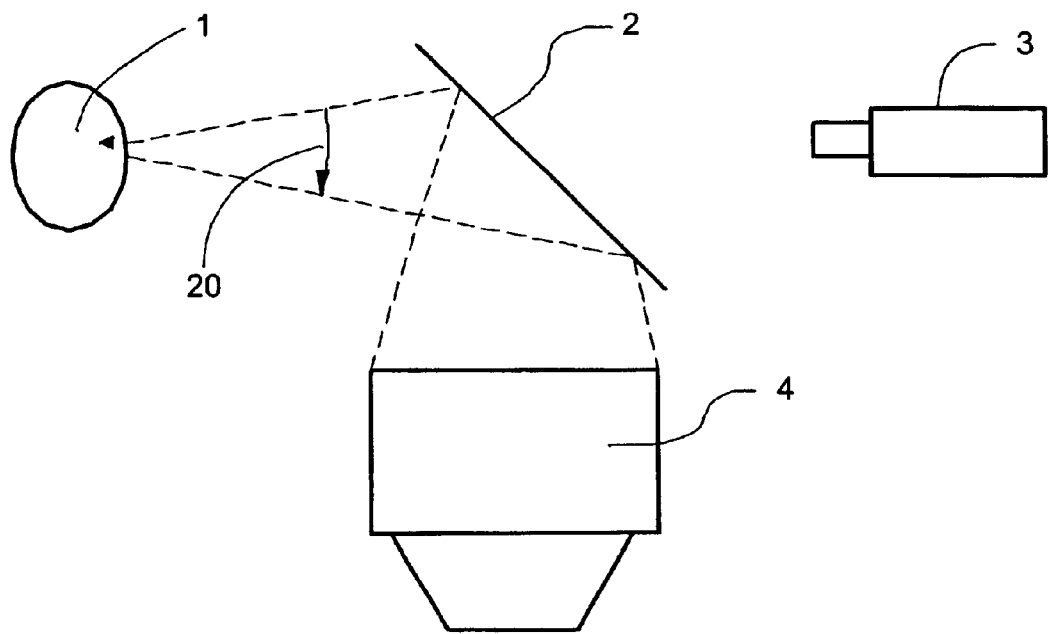
FIG. 1 illustrates a prior art configuration for a display with eye contact.
Figure 2:
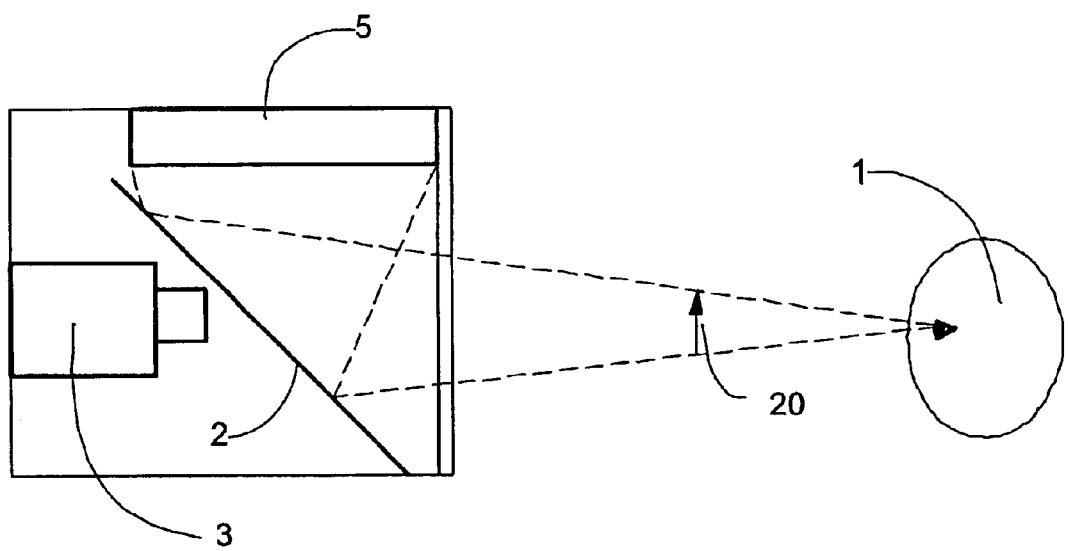
FIG. 2 illustrates a prior art configuration with a flat panel display.
Figure 3:
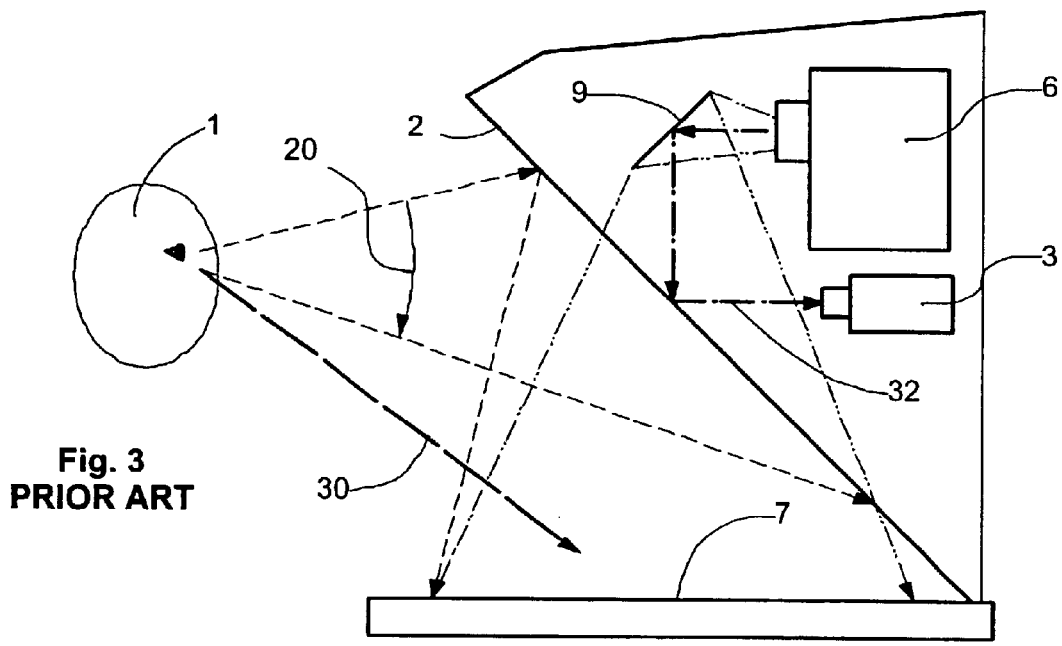
FIG. 3 illustrates a prior art configuration with projection through the two-way mirror.
Figure 4:
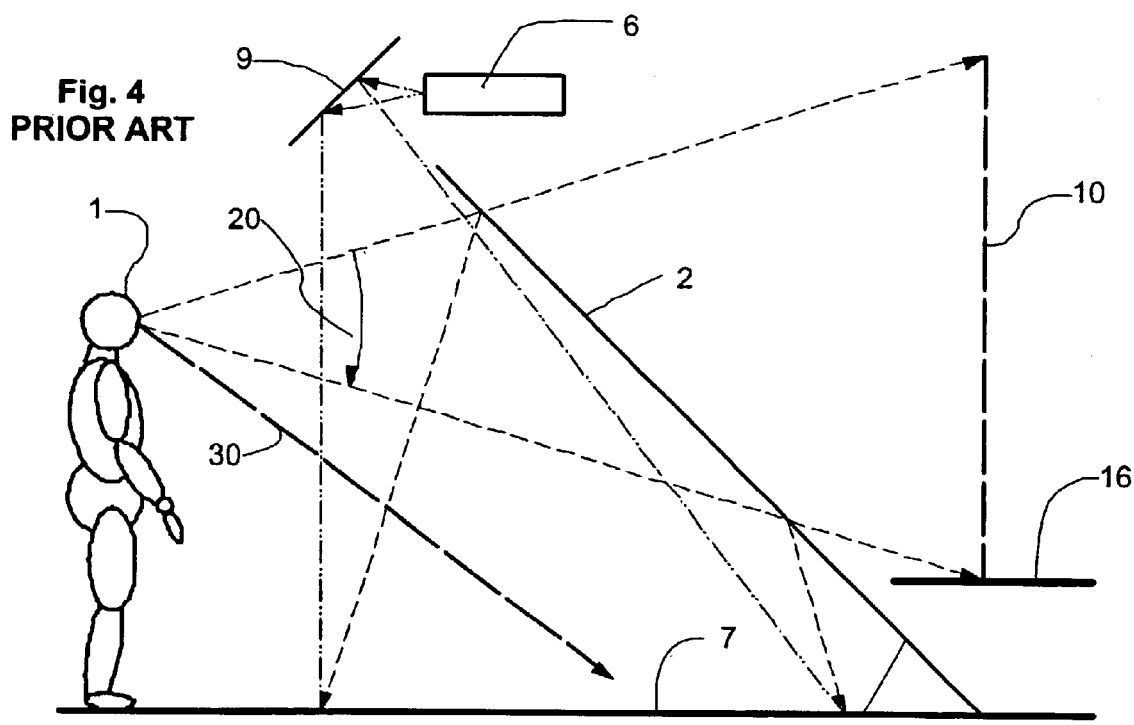
FIG. 4 illustrates a prior art configuration of a stage with an image projected onto a screen positioned on the floor.

Referring now to the drawings, wherein like reference numbers are used to designate like elements throughout the various views, several embodiments of the present invention are further described. The figures are not necessarily drawn to scale, and in some instances the drawings have been exaggerated or simplified for illustrative purposes only. One of ordinary skill in the art will appreciate the many possible applications and variations of the present invention based on the following examples of possible embodiments of the present invention.

Figure 5:
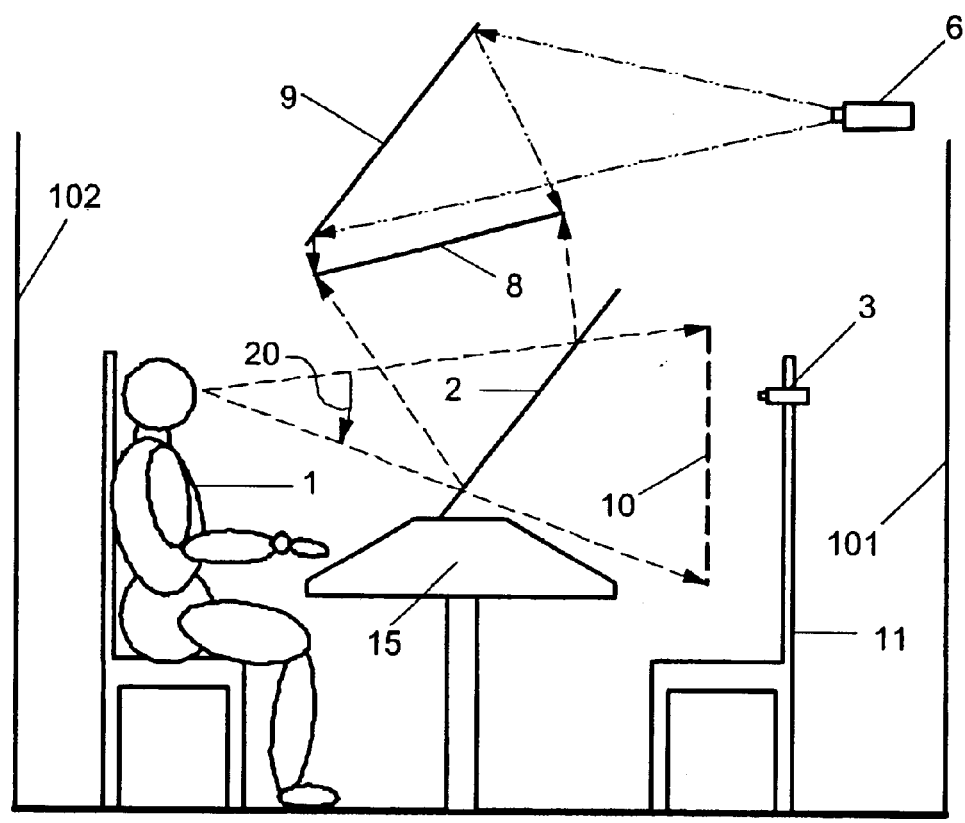
FIG. 5 illustrates prior art of a configuration for the display of a life-size person appearing in a three dimensional setting.

An advanced distance communications system with eye contact is illustrated in FIG. 5. The system of FIG. 5 is described in more detail in commonly owned U.S. patent application Ser. No. 10/049,253, which application is hereby incorporated by reference herein. In FIG. 5, a life-size image 10 of a person is displayed within a three dimensional setting to achieve a sense of presence. This display technology transmits images over high speed networks between, e.g., a home location and a remote location for real time two way communication with a live, life-size appearance of the remote person within a room at the home location. This has been referred to as "teleportation technology."

Figure 6:
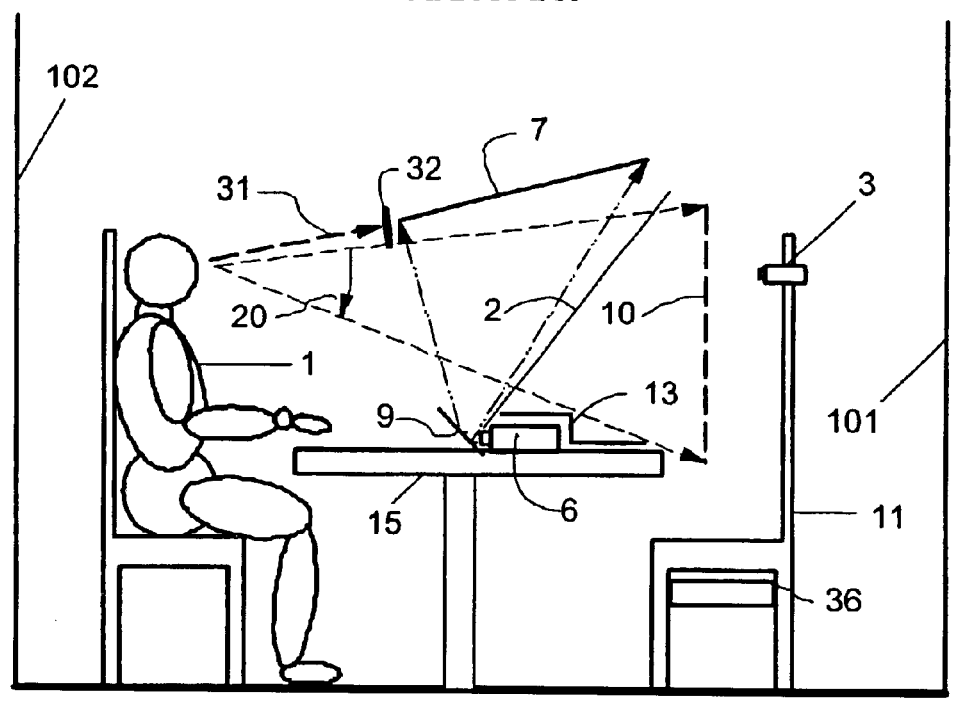
FIG. 6 illustrates a first embodiment of the present invention in the configuration of a desk with front projection of the life-size image.

Referring now to FIG. 6, a first embodiment is shown in accordance with the invention. A projector 6 projects forward onto a mirror 9 where the projection is reflected upward to a front projection screen 7. The projector 6 may project standard NTSC video, PAL video, HDTV or any of a number of different video formats or may project in a computer format using computer animation. The projector 6 may use of any of the available projection technologies, such as LCD or DLP, but a preferred projector would have a high contrast ratio to achieve a bright image and a dark black background. A user 1 looks forward in a normal angle of view 20 toward a two-way mirror 2. The two-way mirror 2 has the characteristic of allowing a percentage of light to transmit through and the rest of the light to be reflected. This may be in the ratio of an even amount of reflection and transmission. A preferred relationship is a 30% reflection with a 70% transmission of light. The two-way mirror may be comprised of glass, plastic or another transparent substrate or may be a stretched film, such as mylar. If the two-way mirror is of a solid substrate, it may be laminated to protect against breakage and to provide safety if the sheet is broken. If the two-way mirror is comprised of glass, it is preferred that one surface of the glass is reflective and the other surface is nonreflective so that there are not double images of reflections.

The user 1 is located in an observation zone, which is a region where the image is intended to be viewed from during use of the system. The two-way mirror 2 is angled to reflect the image projected on the screen 7 so that the reflected image appears in position 10. This arrangement is configured so that the image 10 appears in the three dimensional setting behind the end of the table 15 and in front of the chair 11 and the back wall 101. Furthermore, the life-size image 10 is of a head and shoulders of a person in a remote location and a camera 3 is positioned in the chair 11 at the height of the eyes of the remote person appearing in the projected image 10. This configuration results in an apparent eye contact with the image of the remote person because the line of sight of the remote person is matched by the line of sight of the camera 3. The user 1 is not distracted by the image on the screen 7 because it is positioned out of the line of sight 20 and the surface is not in direct view 31. A baffle 32 may be added to assure that the screen 7 is not in the direct view 31. The camera 3 captures an image of the user 1 in a view of the user 1 in front of a black background 102, which serves the purpose of producing an image of the user 1 against black for transmission to the other location and display in a similar system. The camera 3 also sees a reflection off the two-way mirror of a panel 13 below the two-way mirror. This panel 13 may be matte black so that it does not superimpose an image of the projector 6 and/or the table 15, both of which would be otherwise visible to the camera 3. For audio communications, a conventional speaker phone (not shown) may be used to provide a speaker and microphone, for example. In such case, the speaker phone may be connected into the system of the first embodiment or it may be separately connected over a separate phone line, for example. In other embodiments, the speaker and/or microphone used for audio communication may be part of the system of the present invention. A computer and/or codec 36 is positioned under the chair 11 for handling the video and audio transmission over a network (not shown). The computer system 36 is communicably coupled to a network connection (e.g., ISDN, SDSL, T1 or any other format of high speed communications) for communications across an office or across the world. The transmission can be in recognized protocols, such as H.320, H.323, MPEG4, or any of a number of other protocols that compress and transmit video and audio. The computer/codec 36 can be positioned in other locations without modifying the visual display of the embodiment of the invention.

The first embodiment may be integrated into the table 15 as a permanent communications system or may be a device that is separate from the table 15 and could be moved when not in use. The chair 11 could be an equipment rack that is dedicated to holding equipment for the embodiment of the invention, such as the camera 3 and the computer 36. Alternatively, the chair 11 could serve a dual purpose of performing the communications function when the system is in use and being used as a standard chair at the table 15 when the communications system is not in use.

Figure 7:
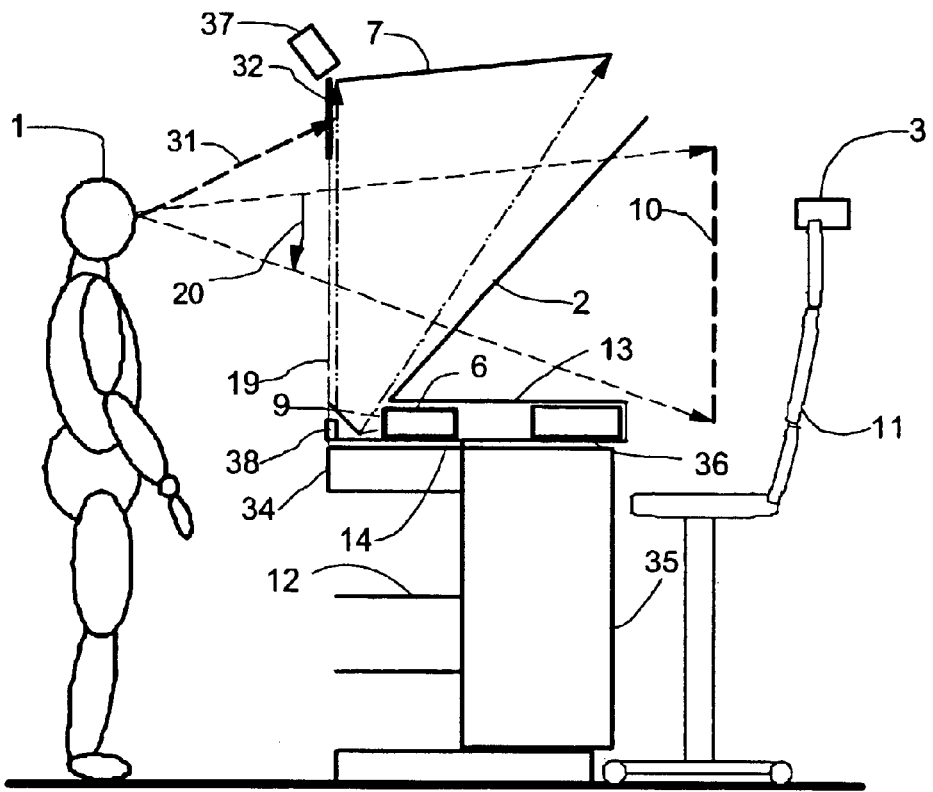
FIG. 7 illustrates a second embodiment of the present invention in the configuration of a help desk or counter for commercial activities.

A second embodiment of the present invention is shown is FIG. 7, which is well suited for a service application, such as a public help desk, service desk or retail counter. This second embodiment can be a freestanding kiosk in a store or can be built into a counter as part of a store or commercial establishment, for example. In this configuration a user 1 views an image 10 that may be of a life-size head and shoulders view of a customer services representative or cashier, who may be at a remote location. With the feature of the upward projection of the image provided by embodiments of the present invention, the presentation equipment and display components of the system may be above a counter or display rack 12, which makes it possible for products to be displayed within the embodiment of the system. The projector 6 and mirror 9 may be positioned on a counter 14. The screen 7 may be lightweight and supported in position above the display rack, e.g., being attached to the upper part of the display rack, the ceiling or within a supporting structure. The screen 7 is not in the direct view 31 of the customer 1 and may have a baffle 32 to block the view of the screen. A protective shield 19 (e.g., protective sheet of glass, thick transparent plastic or acrylic) may be positioned at the front of the display to assure that a person does not look into the light of the projector 6 as is it reflected upward off the mirror 9. If the shield 19 is a sheet of glass, for example, it may be laminated to provide safety from potential breakage and may be produced with a nonreflective coating on a glass substrate so that the users do not see a reflection of themselves in the glass. Other optical properties of the shield may vary also, such as having a polarized characteristic, being transparent in selected directions, distorting or blocking the projector from a typical line of sight, and/or distorting or blocking selected lines of sight to the projector, for example.

In FIG. 7, a speaker 37 is positioned above the baffle 32 so that it can emit sound into the observation zone. Also, a microphone 38 on mounted on the front of the display system to receive sound from the observation zone (e.g., to receive speech from the user 1). In other embodiments, the location of the speaker 37 and microphone 38 may vary. The speaker 37 and microphone 38 are connected to a computer system 36, which acts as the control unit for the system. A cash machine and/or credit card reader 34 is positioned at the front of the embodiment. A supporting piece of equipment 35 is positioned behind the shelving 12 in order to store cash and/or handle the dispensing of products.

A matte black panel 13 covers the top surface of the counter 14 so that the camera 3 does not have a superimposed image of the counter 14 and the projector 6 that would distract from the view through the two-way mirror 2 of the user 1. The panel 13 may have or may be coated or colored to have a surface with a low reflectivity, such as a flat-finished dark color, for example. The image of the remote person 10 may appear to be in a chair 11 within the three dimensional setting of the retail or commercial environment. With this embodiment the customer 1 can have eye contact with the displayed remote person and is able to interact in real time during two-way conversation for activities, such as purchasing goods, renting a car or getting product information.

Figure 8:
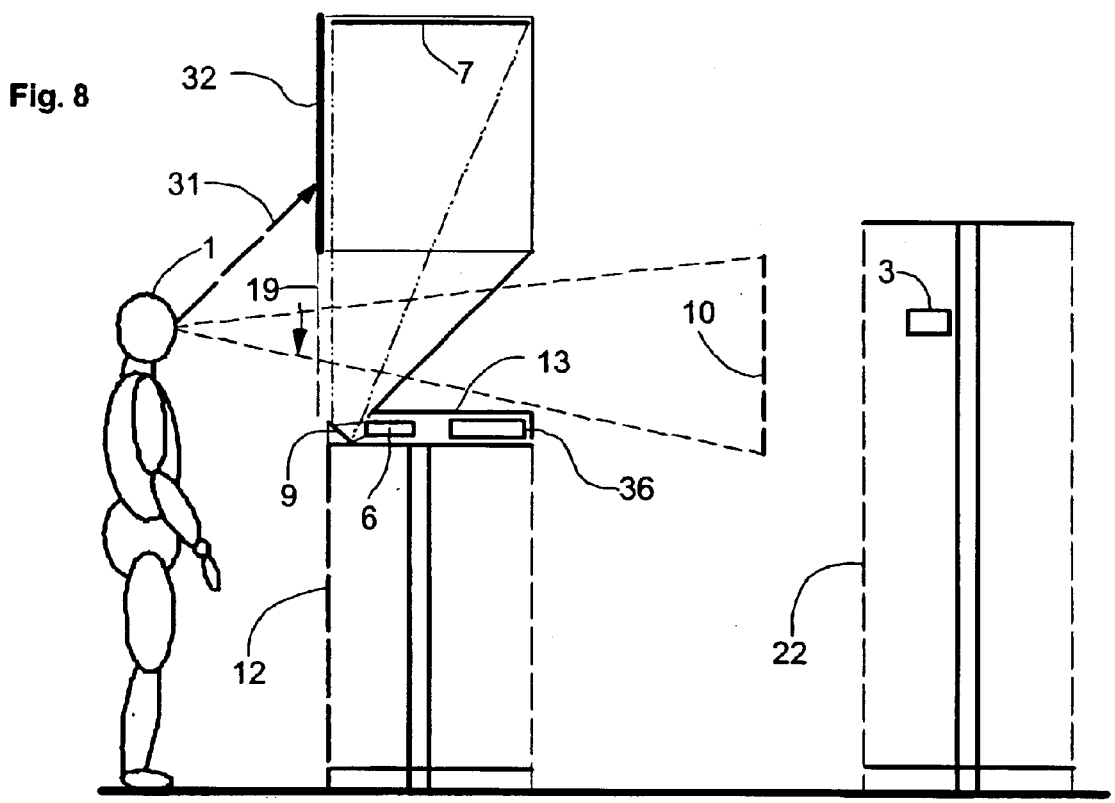
FIG. 8 illustrates a third embodiment of the present invention in the configuration of an installation in shelving within a retail environment.

A third embodiment is shown in FIG. 8, which is a specific configuration of the present invention that is scaled to fit within the standard dimensions of shelves in a typical retail environment. The invention is installed in two rows of shelves with the display system contained in one row of shelves 12 and the camera 3 in a second row of shelves 22. The displayed image of a remote person 10 is displayed in an aisle between the two shelves. The advantage of this configuration is that the system can be installed in any typical store in the world without making a change to the existing layout of the shelving of the store. Furthermore, the system does not extend beyond the current dimensions of the footprint of the shelving. Hence, there would be no restriction of existing available space in the store. Because the screen 7 is positioned in the often unused space above the shelving, the store can continue to stock goods on the shelves below the position of the projector 6. The camera 3 in the second shelving 22 can be contained in a promotional product display with products positioned on shelves above, below, and to the sides of it. However, because the system of the third embodiment may merely display advertisements, the camera 3 is optional. A protective glass sheet 19 may be positioned on the front vertical surface the shelving 12 so that people can not look into the projected beam emanating from the projector 6 and so that the equipment is out of reach from vandals. This embodiment of the present invention offers an opportunity for retailers to generate advertising revenue through the display of promotional material and for the advertisers to benefit from increased sales by displaying products on the shelves below the display device and in the line of sight of the image 10 superimposed in front of the shelves 22 displaying their products. This embodiment may include speakers and a microphone (not shown). A computer/codec 36 may be used for the delivering images to the display system.

Figure 9:
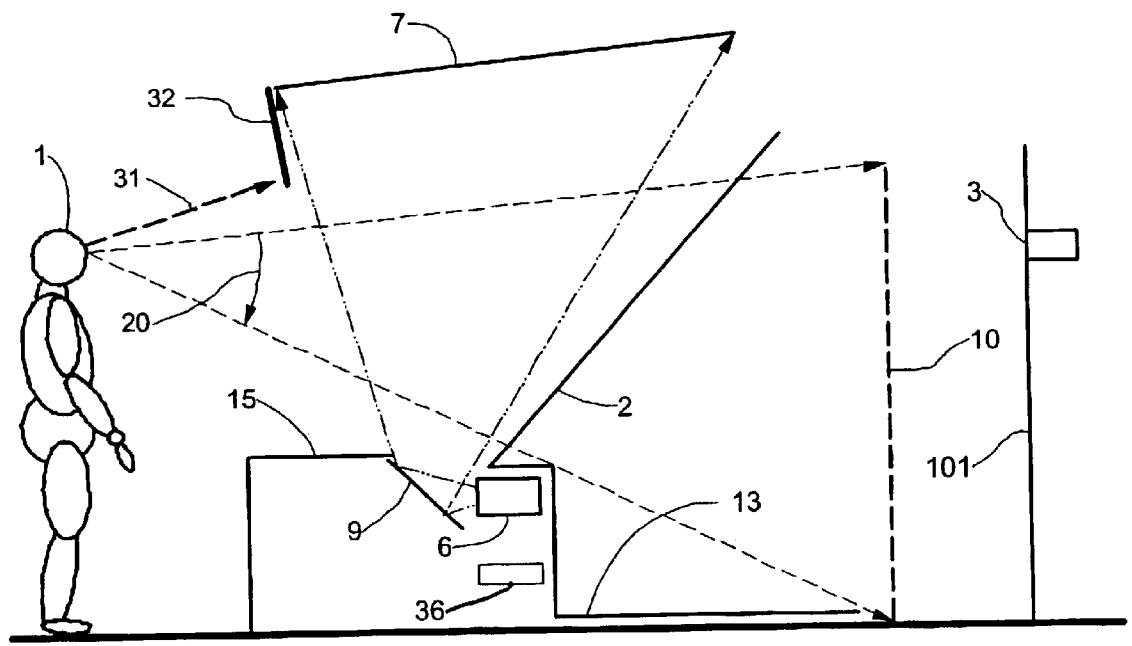
FIG. 9 illustrates a fourth embodiment of the present invention displaying a head to toe image of a person.

A fourth embodiment of the present invention is illustrated in FIG. 9, which may be larger than the prior described embodiments and capable of displaying large visual imagery and life-size head-to-toe images of people. In this configuration a projector 6 projects forward to a mirror 9, which reflects the projection upwards to a screen 7. The image on the screen 7 is viewed by the user 1 as a reflected image off the two-way mirror 2. The user 1 perceives the image to be in the position 10, which is in the three dimensional space in front of the background 101 and behind the two-way mirror 2. The lower surface 13 behind the two-way mirror 2 may be matte black so that it does not add unwanted light and background images to the reflected image captured by the camera 3.

Figure 10:
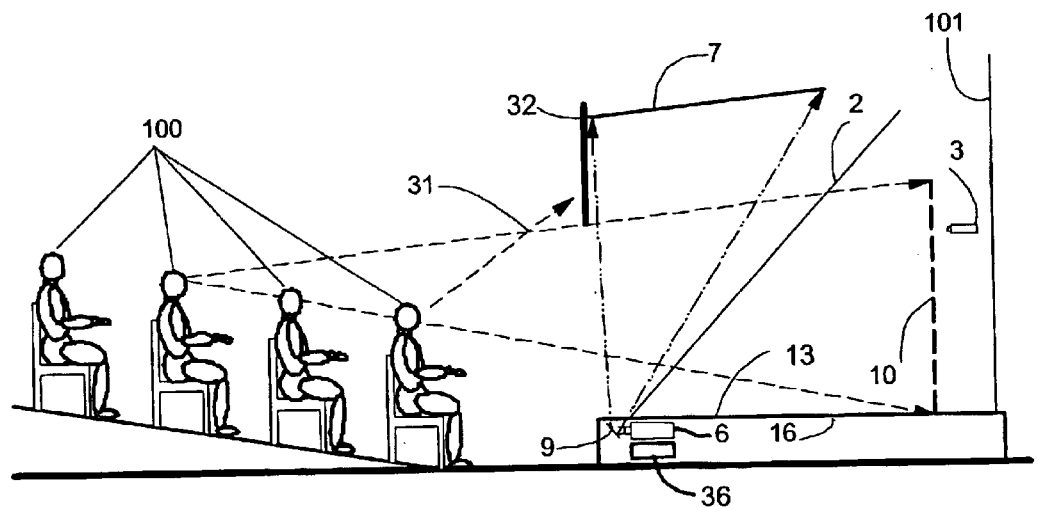
FIG. 10 illustrates a fifth embodiment of the present invention for theatre applications with head to toe life-size images of performers.

A fifth embodiment of the present invention is illustrated in FIG. 10, which is an application in a theatre or large presentation facility. The audience 100 looks forward to view life-size performers at the position 10 as they appear to be on a stage 16 and in front of the stage backdrop 101. The projector 6 is below the level of the stage 16 and projects forward to a mirror 9, which reflects the projection up to a large screen 7. For some applications a camera 3 can be added at eye level to capture an image of the audience 100. The surface of the stage 12 that is below the two-way mirror 2 is preferably matte black so that the reflected image taken by the camera 3 does not capture the image of an illuminated floor. The audience 100 does not have a line of sight 31 of the screen 7 because a baffle 32 is placed above the aperture for the stage.

Figure 11:
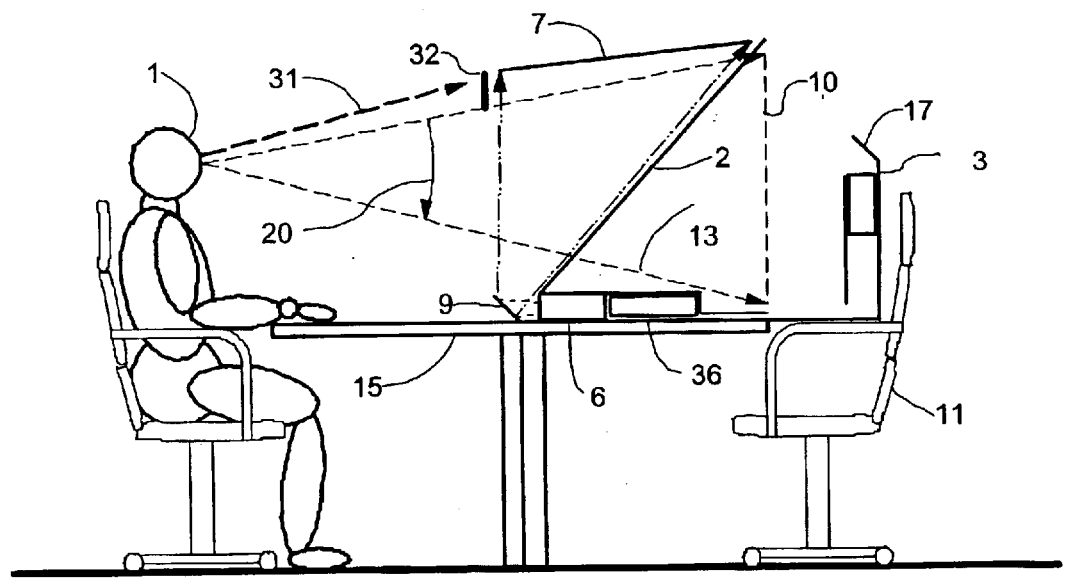
FIG. 11 illustrates a sixth embodiment of the present invention for a portable system in use on a table.

A sixth embodiment of the present invention is illustrated in FIG. 11, which is a foldable and portable embodiment. This embodiment is placed on the top surface of a table, desk, or work surface 15. A user 1 looks forward with a view 20 to see an image appearing to be in position 10. The projector 6 projects forward to mirror 9, which reflects the projection upwards to a screen 7. The user 1 does not see the screen 7 in a line of sight 31 because there is a baffle 32. In some applications, a camera 3 can be added to the embodiment. The camera 3 captures an image through the reflection off a mirror 17, which views the user 1 through the two-way mirror 2. Likewise, in the first five embodiments shown and described above, the camera 3 may be oriented so that it requires a mirror 17 to receive the desired image from the observation zone. It is also possible for the camera 3 to be in a horizontal orientation where it can have a direct view of the user 1 without the usage of the mirror 17. The surface 13 below the two-way mirror 2 is preferably matte black so that little or no reflected light or images from behind the two-way mirror 2 are captured by the camera 3.

The sixth embodiment could be an integral part of the table 15. The folding sequence for closing the system, as illustrated in FIGS. 12–16, could be applied to the closing of the system to be enclosed in the thickness of the tabletop.

Figure 12:
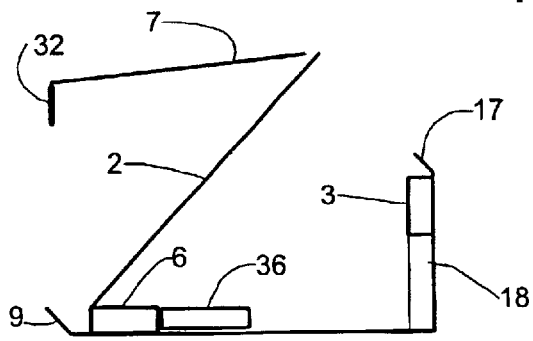
FIG. 12 illustrates the portable system by of FIG. 11.
Figure 13:
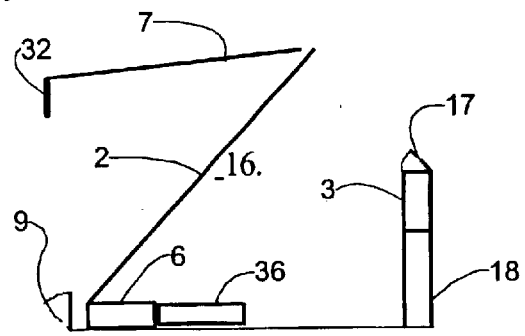
FIG. 13 illustrates the portable system with the camera and projector mirrors in the closed position.
Figure 14:
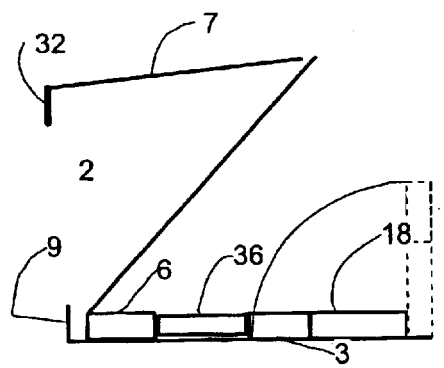
FIG. 14 illustrates the portable system with the camera support folded down.
Figure 15:
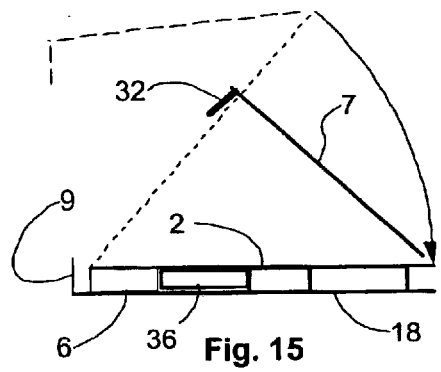
FIG. 15 illustrates the portable system with two-way mirror and screen pivoted down.
Figure 16:
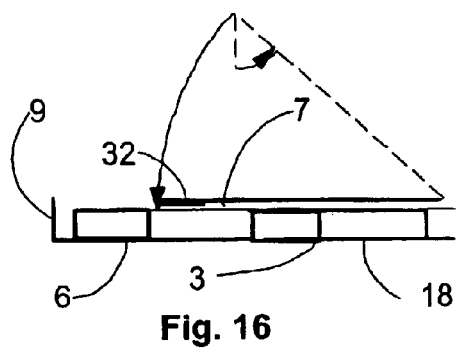
FIG. 16 illustrates the portable system with the screen folded down.
Figure 17:
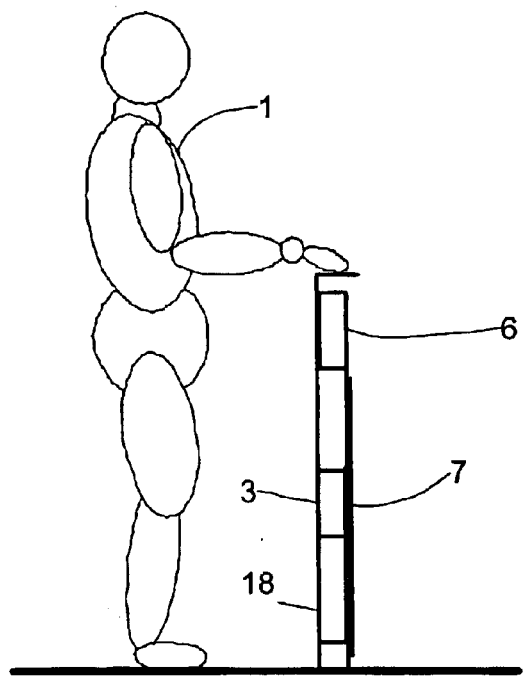
FIG. 17 illustrates the closed portable system next to a person.

A folding sequence for closing the portable sixth embodiment is shown in FIGS. 12–16. FIG. 12 shows the portable sixth embodiment of the present invention separate from its usage on a table. FIG. 13 shows the sixth embodiment with the mirror 9 pivoted toward the projector 6. The mirror 17 is pivoted downwards toward the camera 3. FIG. 14 shows the camera 3 on a supporting structure 18 pivoted downwards. FIG. 15 shows the two-way mirror 2 with the screen 7 and the baffle 32 pivoted downwards. FIG. 16 shows the baffle 32 pivoted inwards and the screen 7 pivoted downwards. FIG. 17 shows a person 1 standing next to the closed configuration of the portable sixth embodiment of the present invention.

Figure 18:
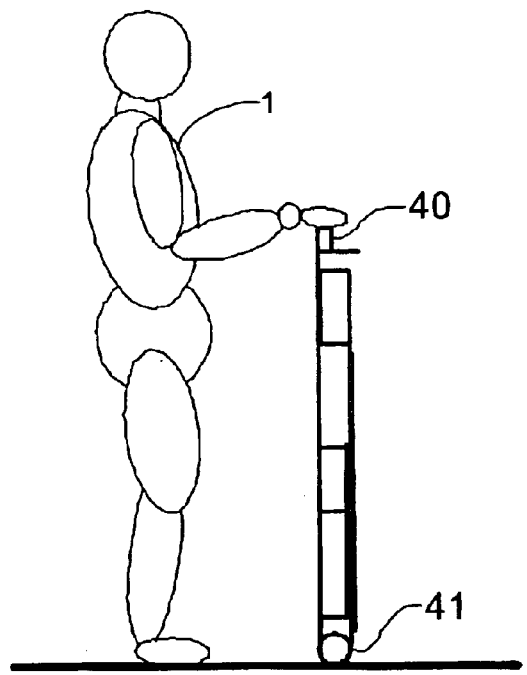
FIG. 18 illustrates the closed portable system with integrated wheels and handle.

Also, the sixth embodiment of FIGS. 12–17 may have wheels 41 shown in FIG. 18 (e.g., permanently attached, removable with a tool, or quick-release wheels) and a handle 40 (e.g., permanently attached, removable with a tool, or a quick-release handle) to allow the system to be moved easier when it is in a closed and folded configuration.

Figure 19:
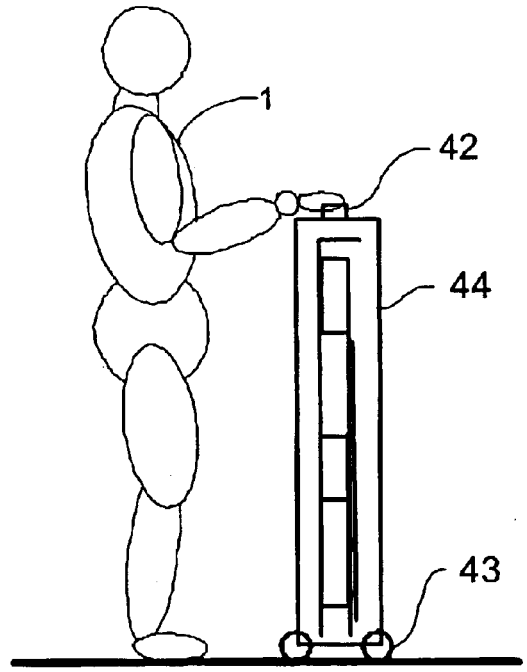
FIG. 19 illustrates the closed portable system in a shipping case with wheels and a handle.
Figure 20:
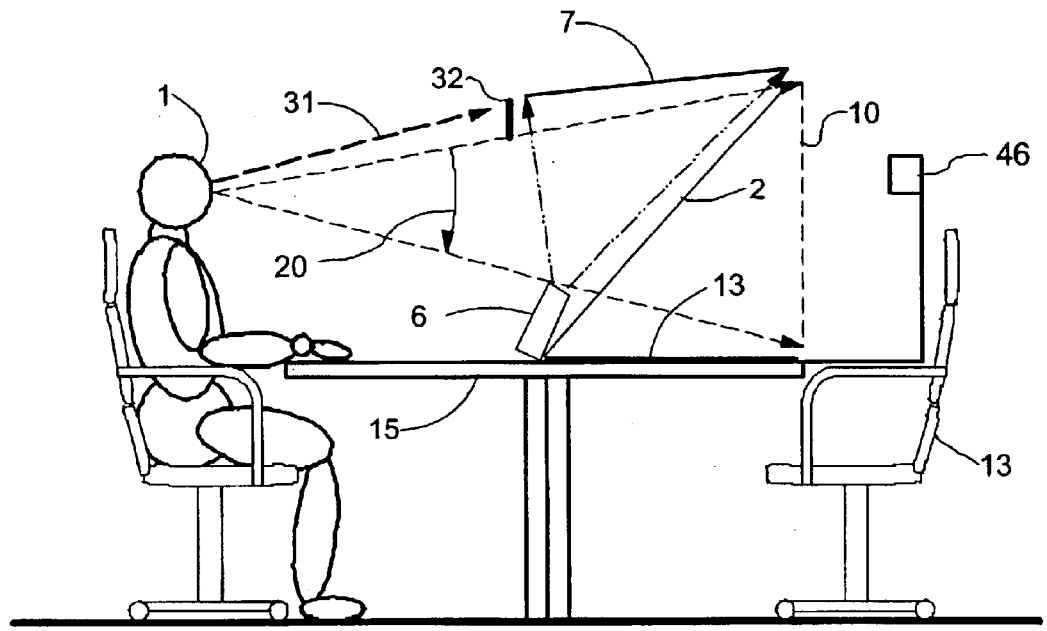
FIG. 20 illustrates a seventh embodiment of the invention for a portable system with a direct projection onto the screen and a direct view by the camera.

In alternative, the system of the sixth embodiment may have a carrying case 44 shown in FIG. 19 (perhaps with a set of wheels 43 and a handle 42) that it fits into to protect it during transportation.

A seventh embodiment of a foldable and portable communication system in accordance with the present invention is shown in FIGS. 20 thru 24. In the seventh embodiment, a small camera 46 is oriented so that it receives a desired image from the observation zone, for example, without the need for a mirror. Also, the projector 6 is positioned so that it projects images directly onto the projection surface of the screen 7. Hence, the sixth and seventh embodiments illustrate that a foldable and portable embodiment of the present invention can have a variety of configurations and linkages.

The seventh embodiment could be an integral part of the table 15. The folding sequence for closing the system, as illustrated in FIGS. 21–24, could be applied to the closing of the system to be enclosed in the thickness of the tabletop.

Figure 21:
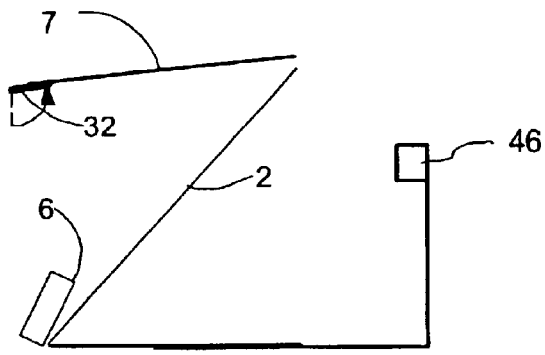
FIG. 21 illustrates the portable system with the baffle pivoted inward.
Figure 22:
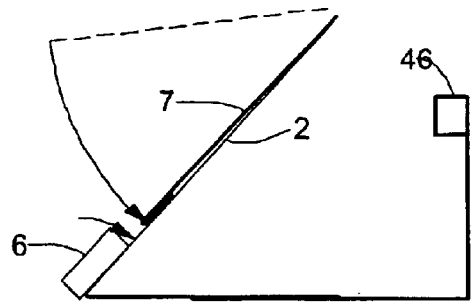
FIG. 22 illustrates the portable system with the screen pivoted down and the projector pivoted down to the plane of the two-way mirror.
Figure 23:
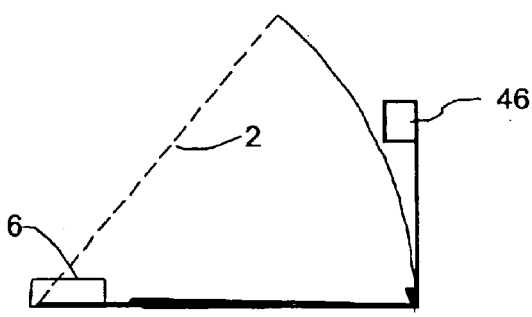
FIG. 23 illustrates the portable system with the two-way mirror pivoted down.
Figure 24:
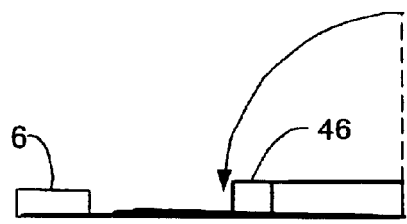
FIG. 24 illustrates the portable system with the camera support folded down.

A folding sequence for closing the portable seventh embodiment is shown in FIGS. 21 through 24. FIG. 21 illustrates a baffle 32 pivoted back toward the screen 7. FIG. 22 illustrates the screen, pivoted down to the plane of the two-way mirror 2 and the projector pivoted toward the two-way mirror. FIG. 23 illustrates the two way mirror 2, the projector and the attached components pivoted down into a horizontal orientation. FIG. 24 illustrates the camera support with the camera 46 pivoted down to complete the closure of the portable system.

Figure 25:
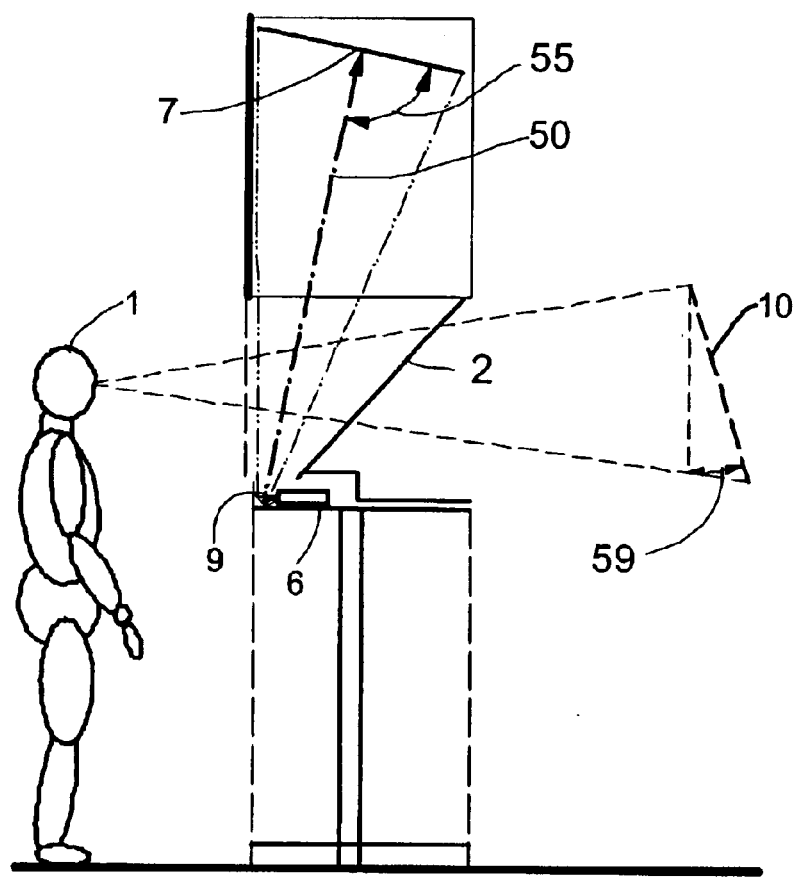
FIG. 25 illustrates an embodiment with a projector that projects on a central axis with the projection path perpendicular to the screen.

The numerous example embodiments of the present invention described above each use a projector 6 that outputs an image directed toward a front projection screen 7 overhead. The arrangement of each embodiment described above uses a two-way mirror 2 angled from a ground surface upwards with the top portion farthest from the viewer 1, relative the bottom portion of the two-way mirror 2. The angle of the two-way mirror 2 is typically about 45 degrees, but this can be varied to meet specific requirements for the positioning of the reflected image. FIG. 25 shows a typical embodiment of the present invention with a projector 6 that has a projection path 50 on a central axis with the lens of the projector 6. In this illustration the projection path 50 is at a 90 degree angle 55 relative to the screen 7. When the image on the screen 7 is viewed through the two-way mirror 2 the image 10 appears to be angled back with the bottom further away from the user 1. This creates a problem in that the image 10 is not vertical and therefore appears to be misaligned. The amount of misalignment is shown in the angle 59, which in this illustration is 17 degrees.

Figure 26:
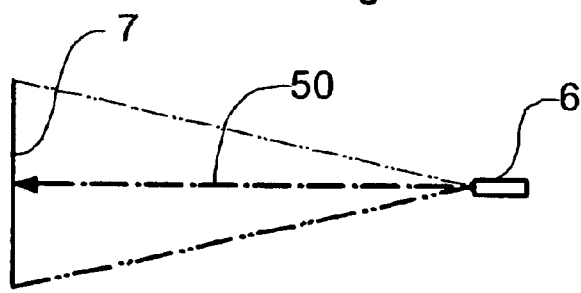
FIG. 26 illustrates a side view of a projection path of a projector with a central axis with the projection path perpendicular to the screen.
Figure 27:
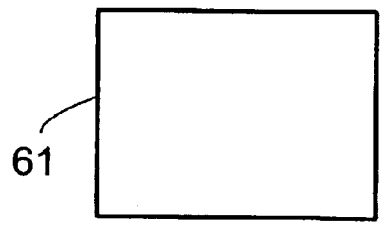
FIG. 27 illustrates a front view of a screen with projection of a central axis projector with the projection path perpendicular to the screen.

FIG. 26 shows a projection path 50 that is on a central axis with the projector 6 so that the angle 55 is at 90 degrees relative to the screen 7. With this projection path the image 61 is a rectangle that is not distorted as illustrated in FIG. 27.

Figure 28:
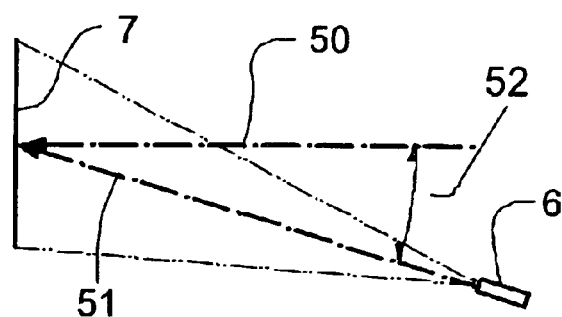
FIG. 28 illustrates a side view of a projection path of a projector with a central axis with the projection path that is at an angle to the screen.

FIG. 28 shows a projection path 51 that is at an angle 52 relative to a central projection path 50 that is 90 degrees to the screen 7. This angle 52 of offset of the projection path in this illustration is 17 degrees, which is typical of the offset that is necessary for an embodiment of the invention to generate a vertical image in the position of the displayed image 10.

Figure 29:
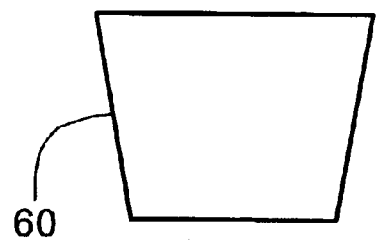
FIG. 29 illustrates a front view of a projected image on a screen with the projection of a projector with a central axis with a projection path that is at an angle point up toward the screen to produce a trapezoidal shape to the projected image.

This angle of offset 52 from the central axis 50 toward the screen will produce a trapezoidal image 60, which is a distortion called keystoning, as illustrated in FIG. 29. This effect is undesirable and will result in a distorted image as seen by a user 1.

One of the unique features of this present invention is that it can take advantage of the offset that is common in the projectors used for normal presentations. FIG. 25 shows a projection path 51 for a typical projector 6 that is mass produced for standard applications and therefore is the type of projector to have the lowest price. The reason for the offset function is that projectors for general usage are designed to be placed in a horizontal position on a table with the projection path in the projector angled up to reach a screen at the far end of the room with the bottom of the screen above the level of the table. The angle of the offset 53 is typically 17 degrees relative to a line of projection on a central axis 50. Since this offset 53 is common for projectors, the present invention can be produced using inexpensive equipment to achieve the desired effect, which makes the present invention commercially practical.

FIG. 31 shows the image 61 or the projection resulting from the projector 6 with the angled projection path 51. The optics in the projector 6 have corrected for the intended offset projection so that the image 61 is not distorted.

FIG. 32 shows that in order to use the projector 6 in the numerous embodiments illustrated in this patent application, the projector 6 is positioned upside down with the line of projection 51 pointing down.

FIG. 33 shows the projection path 51 as configured in FIG. 32 with a mirror 9 in front of the projector 6. The mirror 9 is angled at 42.5 degrees away from the projector 6. The angle of the mirror 9 may vary depending on the offset angle 53 of projection path 51.

FIG. 34 shows the illustration of FIG. 33 positioned in a typical embodiment of the present invention with the reflection of the screen 7 off the two-way mirror 2 so that the displayed image 10 in the three dimensional setting appears to be vertical with the central axis of the screen 54 horizontal. In this illustration the two-way mirror is angled back and away from the user at 48 degrees, which could vary in different configurations depending on the angle of the screen 7.

Figure 35:
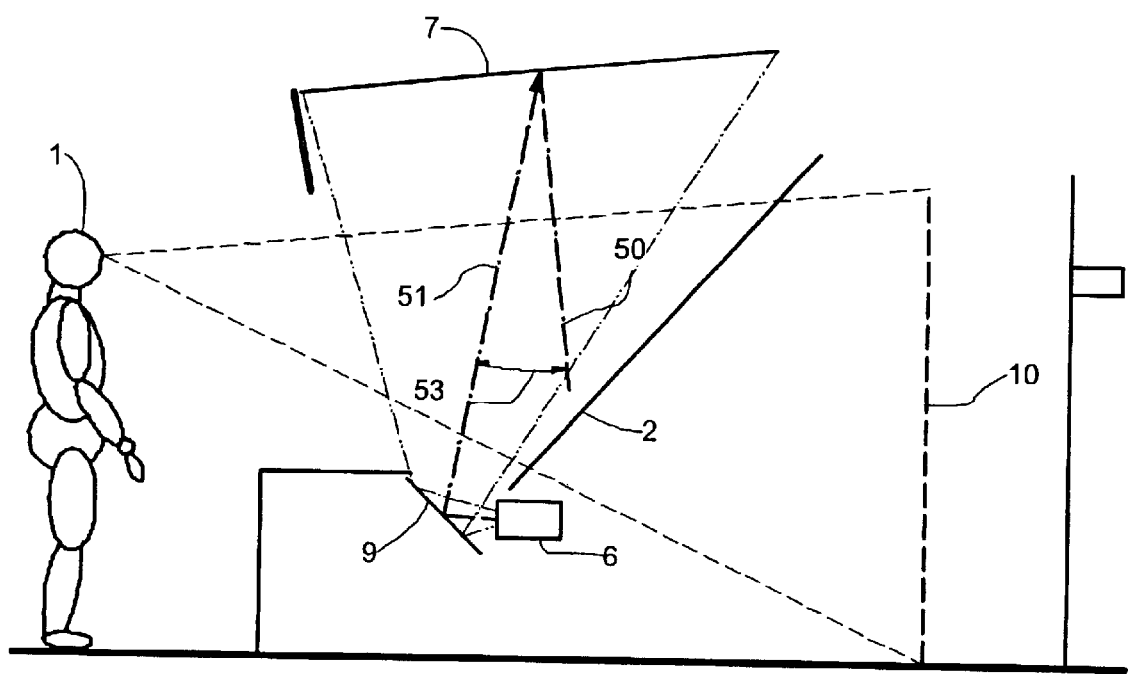
FIG. 35 illustrates an embodiment of the invention with a wide angle lens and a projector with a central axis of projection.
Figure 36:
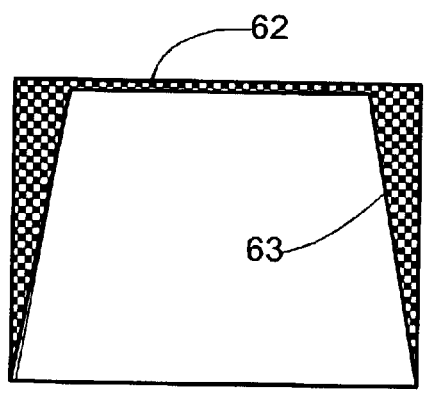
FIG. 36 illustrates a video image distorted prior to projection.
Figure 37:
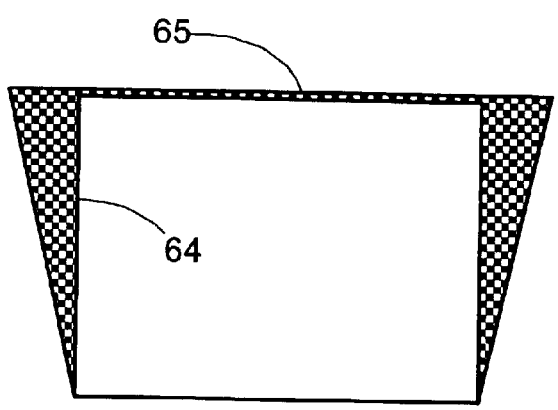
FIG. 37 illustrates the projection of the image in FIG. 36 as it is projected at an angle to distort the image.

FIG. 35 shows an embodiment of the invention with a short projection distance between the projector 6 and the screen 7, which is achieved with the usage of a wide angle projection lens. It is typical that projectors using wide angle lenses do not have the ability to offset the angle of the projection 51. Therefore, it is not possible to achieve the required offset angle through the optics of the projection system. However, some professional projectors have a feature for digitally correcting the keystoning effect. This is achieved by altering the shape of the video image before it is projected, as illustrated in FIG. 36. The video image 62 is distorted into a trapezoidal shape 63 that is in proportion to the keystoning produced in the projected image in FIG. 37, but the distortion digitally generated internally in the projector 63 is in the opposite direction as the projected image 65. The distorted image 63 generated in the projector becomes a rectangular shape 64 when the resulting projection 65 is distorted in the same proportion. If the projector does not have this feature, it may be necessary to alter the shape of the video image in a special effects video mixer, for example, prior to projecting the image.

The quality of the projected image in all of the embodiments of the invention can be affected by the type of screen that is used, since it is critical to have a dense black image for a background for images that are intended to appear to be floating or superimposed in the three dimensional setting. If the projected black background is visible to the user, it will provide a visual clue that the image is actually contained on a projection screen. This would break the illusion of appearing in free space. For this reason it is preferable to use a screen that will minimize the reflection of ambient light. A standard white projection screen may appear to be somewhat light in value, even when there is not light projected on it directly from the projector. One solution is to use a gray screen, but this will darken the projected video images as well as the background. A preferred solution is to use a high gain, silvered screen, which will brightly reflect projected images and will not be illuminated to any great degree by extraneous light emanating from outside of the projection path.

Figure 38:
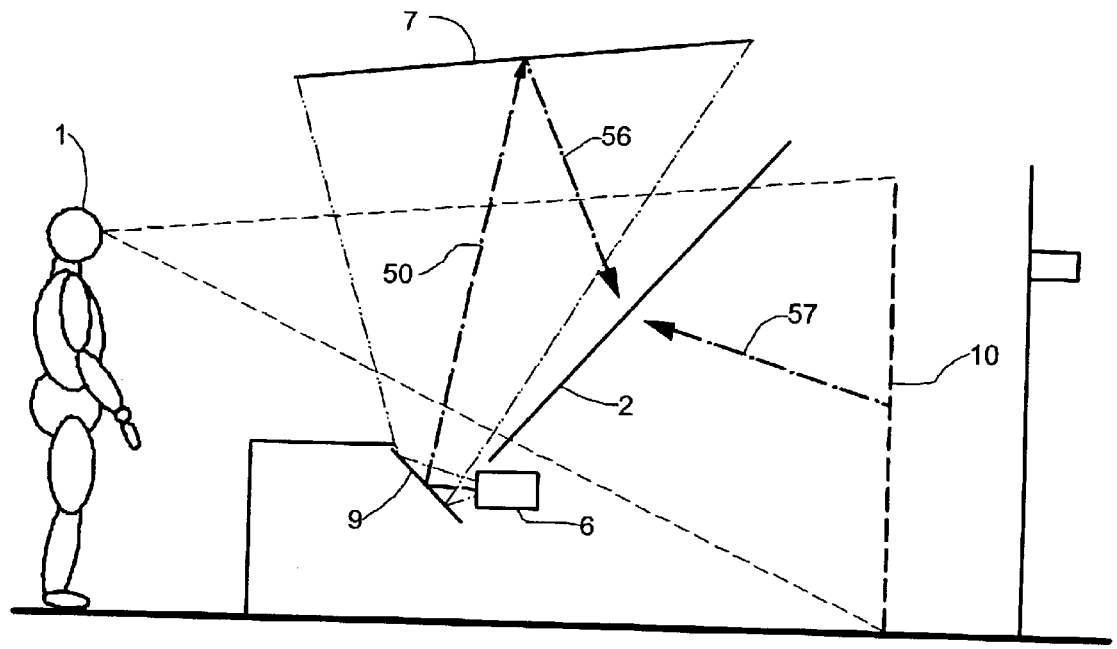
FIG. 38 illustrates the direction of reflection off the screen in an embodiment of the invention.

FIG. 38 shows an embodiment of the present invention with the central axis of projection 50 striking the screen 7 and reflecting at an angle 56. The illustration shows the image of the screen 7 as it appears reflected off the two-way mirror 2 and also shows the angle of the reflected central axis of projection 57 as it is viewed by the user 1 looking ahead toward the two-way mirror 2. Since our present invention requires that the central axis of the projection 50 is at an angle toward the screen 7, it would be likely that the angle of the central axis of the reflected light 57 would be in a direction away from the user 1. However, the configuration of this embodiment of the invention demonstrates that the central axis of projection 57 is directed toward the viewing position of the user 1, which is ideal for the best illumination of the image 10.

Figure 39:
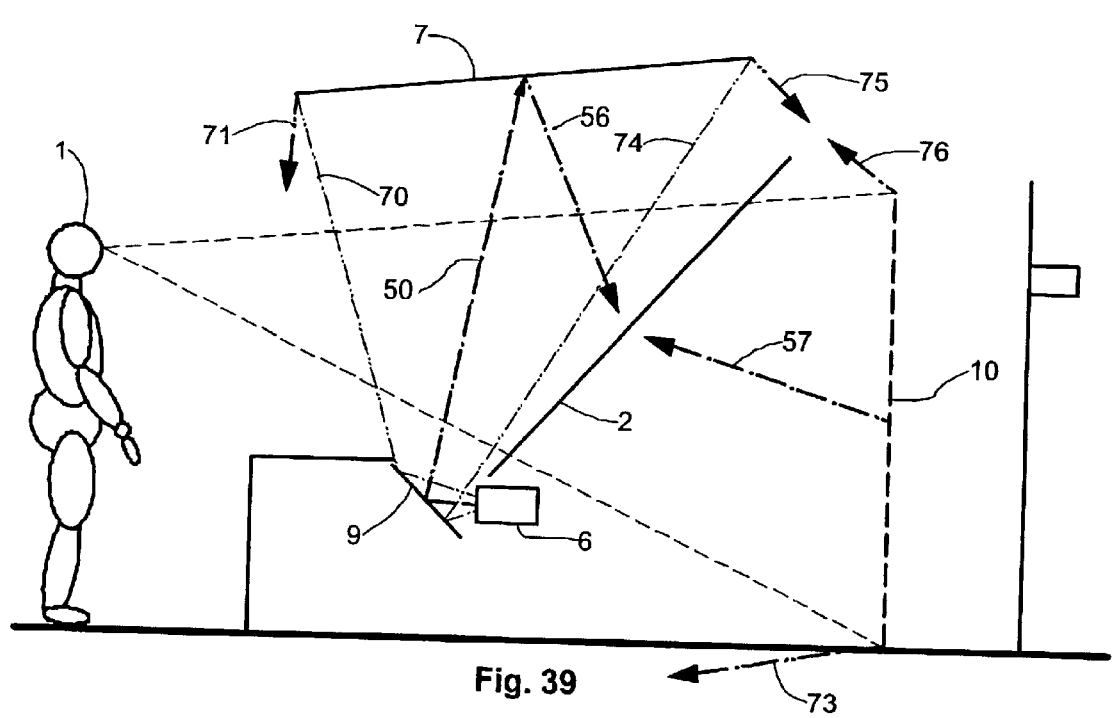
FIG. 39 illustrates the directions of reflection of the outside edges on a silvered screen.

There is, however, a limitation of high gain, silver screens in that they reflect light like a diffuse mirror. The result is that the image is bright within a limited angle of view from the direction of the reflected image and rapidly becomes darker the more the light is reflected to the sides in a direction away from the user. This can result a hot spot in one position of a screen with the rest of the screen rapidly diminishing in brightness. This is illustrated in FIG. 39 where the central axis of projection 50 is reflected off the silver screen 7 at an angle 56. The user 1 sees the reflected screen 7 in the two-way mirror 2 to see the image 10 with the bright spot in the area of the reflected central axis of projection 57. In contrast, the upwards projection 70 closest to the user 1 is reflected off the screen 7 in the direction of 71. When this portion of the screen is viewed as a reflection in the two-way mirror 2, it appears at the bottom of the image 10. The direction of the reflection of light 71 off the screen 7 as it is viewed through the two-way mirror 2 is in a direction 73 toward the ground. This will cause this portion of the image 10 to be dark. Furthermore, the projection 74 toward the top back portion of the screen 7 reflects at an angle 75. As this portion of the image 75 is viewed as a reflection off the two-way mirror 2, the direction of the light is upwards in a direction 76 away from the user. This will cause the top of the image 10 to appear to be dark relative to the bright reflection 57. This same effect will take place on the sides of the screen resulting in a hot spot in the middle of the screen with the rest of the screen becoming dark toward the outside portions.

Figure 40:
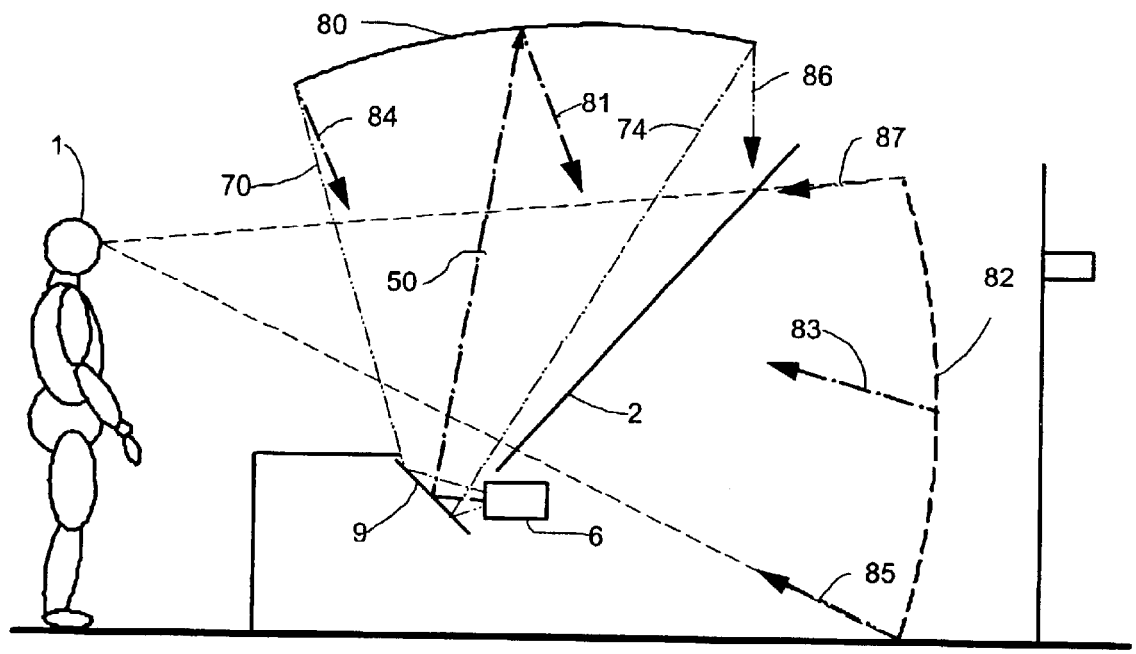
FIG. 40 illustrates the directions of reflections of light projected on a concave screen.

FIG. 40 illustrates a solution for the hotspot problem with the usage of a concave screen 80. In this embodiment of the present invention the central axis of projection 50 is the same and it reflects off the concave screen 80 in a similar direction 81 as with a flat screen 7. In this way the central axis of projection is viewed by the user 1 as seen reflected off the two-way mirror 2 as a bright image in the central direction 83 of the superimposed image 82. The projection upwards 70 closest to the user reflects off the concave screen at an angle 84 that is pointing more inward. The reflection of the angle of light 84 as seen as a reflection in the two-way mirror 2 is in a direction 85 toward the user 1. In this way the bottom of the image 82 will be just as brightly lit as the central position 83. Furthermore, the light projected upwards 74 toward the back of the concave screen 80 is reflected in an inward direction 86. This top position of the image 82 as it is reflected in the two-way mirror 2 is directed 87 toward the user 1. Also, the top portion of the image 87 will be equally bright with the central portion 83 and the bottom 85. This same principle will apply to the lateral curvature of the concave screen 80 for even illumination over the total surface of the image 82. The principle of using a concave screen 80 may be applied to all of the illustrated embodiments and other variations of the present invention.

Figure 41:
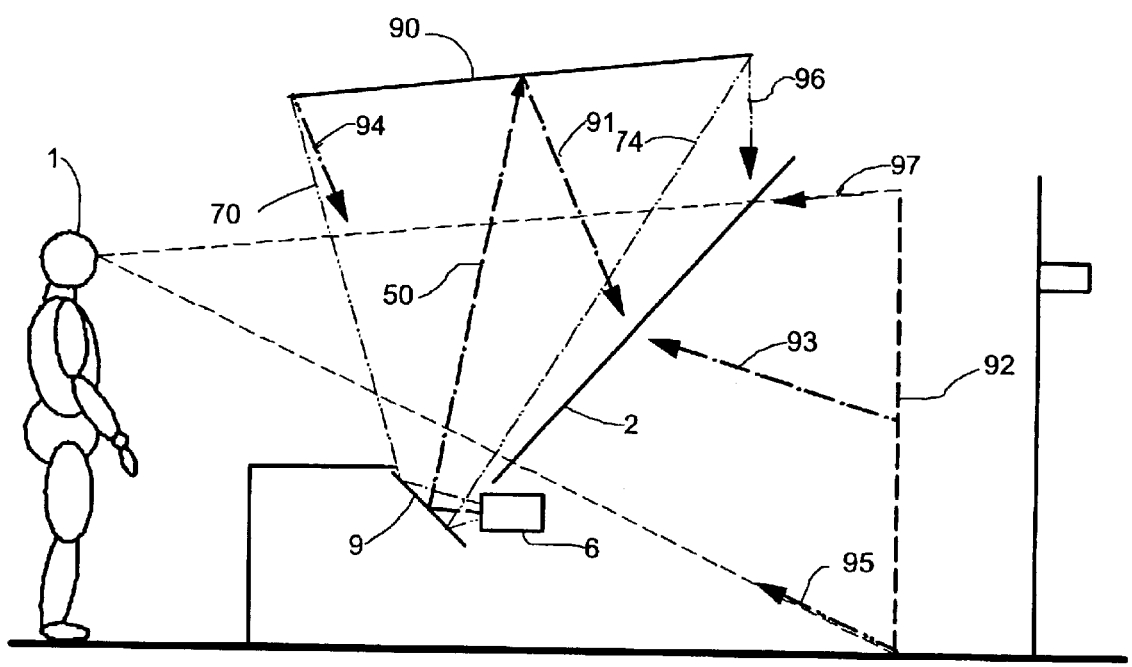
FIG. 41 illustrates the directions of reflections of a screen with a reflective fresnel pattern.

FIG. 41 shows another approach to solving the problem of hotspotting or uneven illumination over the total screen surface 90. This embodiment of the present invention uses a high gain, silvered surface that has a pattern similar to a fresnel lens. The pattern is a series of ridges in concentric circles that reflect light in the desired direction toward the user 1. The ridges will be fine enough they will not be apparent from the viewing distance of a user 1. Specifically, light striking an outside edge of the screen area, such as the upward projected light 70, will strike a silvered ridge surface that will reflect the light in the direction 94 inward. The light 94 from the lower portion of the screen 90 will be viewed as a reflection off the two-way mirror and will be directed at an angle 95 toward the user 1 as the lower portion of the image 92. Similarly, light projected to the far edge of the screen 74 will strike a ridge angled on the screen 90 to reflect the light 96 in an inward direction. This angled light 96 will be viewed by the user 1 as a reflection off the two-way mirror that will be at an angle 97 toward the user 1 as the upper part of the image 92. This pattern of ridges will cover the total surface of the screen 90 to achieve an even illumination for the user 1. This principle of using a silvered screen with a lenticular pattern to control the direction of light may be applied to all of the illustrated embodiments and other variations of the present invention.

Figure 42:
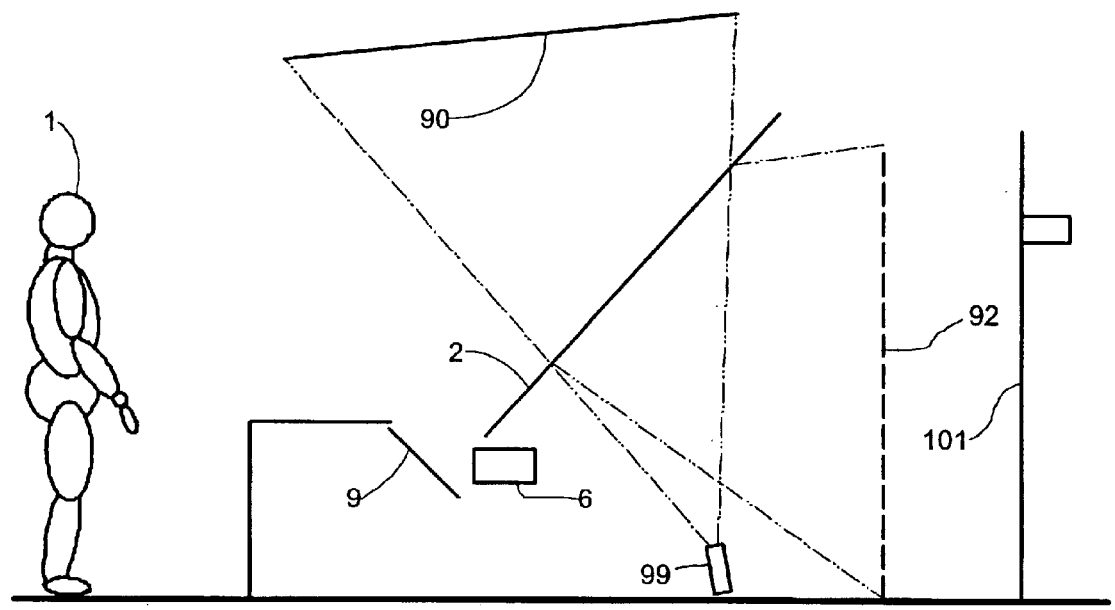
FIG. 42 illustrates the placement of a camera below the two-way mirror to capture a combined image of the screen and a view of the three dimensional setting.

FIG. 42 shows an embodiment of the present invention with a second camera 99 that is positioned to have a view toward the screen 90. In addition to seeing the view of the screen 90 through the two-way mirror, the camera 99 will see a reflection of the three dimensional setting in front of background 101. This camera 99 can therefore capture an image that is similar to the view of the user 1. The advantage of placing the camera in this position is that it is not in the space with the user 1, which would interfere with the user experience and would place the expensive piece of equipment in a public location where it could be stolen or vandalized. The camera 99 can be used to capture images of people standing in the three dimensional setting in front of the background 101. This image could be displayed on a monitor or a screen to the side of the location of the three dimensional setting (not shown) so that a person in the three dimensional setting would see themselves appearing to be in the same location as the life-size image of the superimposed image displayed with the invention. When the present invention is used in conjunction with a camera 3 for transmitting a line of sight for a remote person appearing in the three dimensional setting, it is advantageous to also transmit the combined view of the three dimensional setting captured by the second camera 99, so that the remote person can monitor the interaction between the live person and their appearance within the three dimensional setting. The camera may take images that could be printed for sale to the person in the view with the displayed life-size image. This could be applied to commercial activities of charging for the appearances of celebrities for personal interaction. The camera could also capture video for the sale of live video interaction with paying customers.

Figure 43:
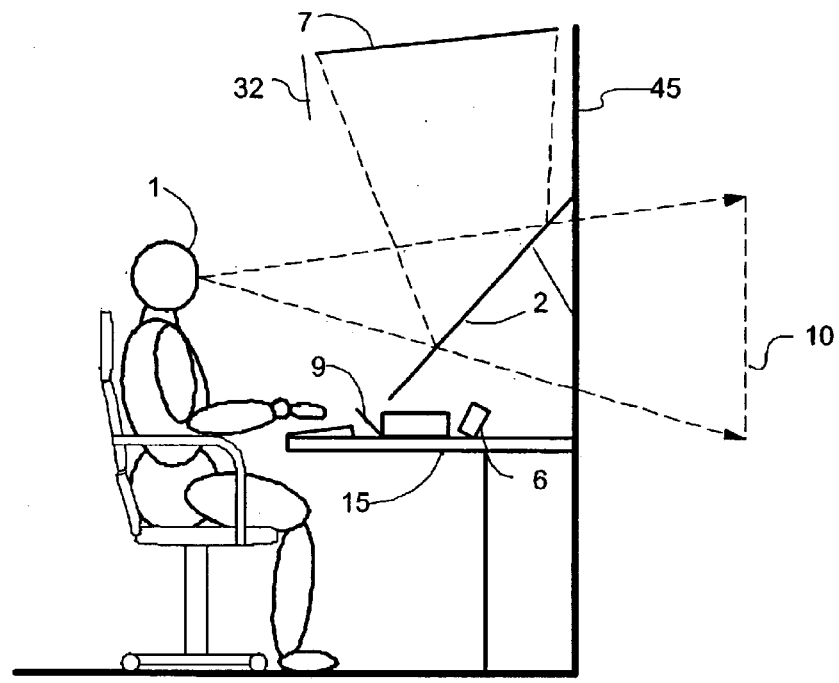
FIG. 43 illustrates a desktop system with the reflected image appearing to be behind the back of the unit.

FIG. 43 shows an embodiment of the present invention that can be placed on or integral to a desktop or other work surface to be viewed from a seated position. In this configuration the user 1 views the image on screen 7 reflected in the two mirror 2 so that it appears in a position 10. The between the two way mirror 2 and the back panel 45 is covered in black and is enclosed so that no outside light illuminates the interior space. Since there is no illumination of the space behind the two way mirror 2 the image 10 appears in free space with no visual reference to the back panel 45. The advantage of this embodiment is that the system can be operated with a minimal depth. Since this desktop system can be fit in a normal office setting, the system could be used alternately for the display of life-size images and for the display of a computer applications typically displayed on a computer monitor.

Figure 44:
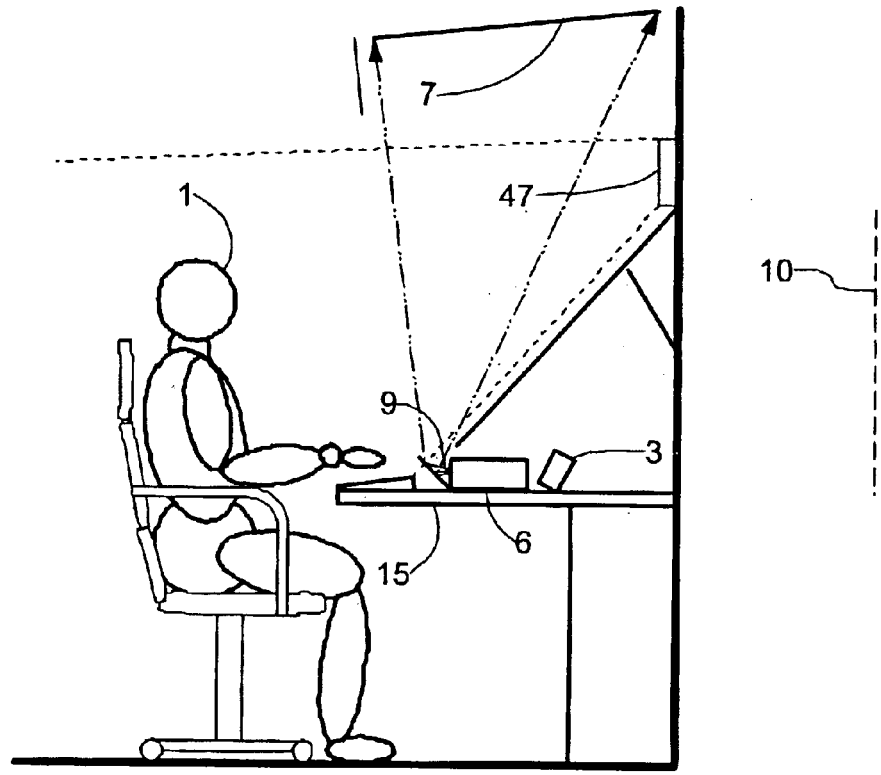
FIG. 44 illustrates a desktop system with projection of the image to a screen above and a light to illuminate the user.

FIG. 44 shows the above embodiment of the present invention with projector 6 projecting onto a mirror 9 so that the projection is projected onto an overhead screen 7. A light 48 is directed to illuminate the user 1.

Figure 45:
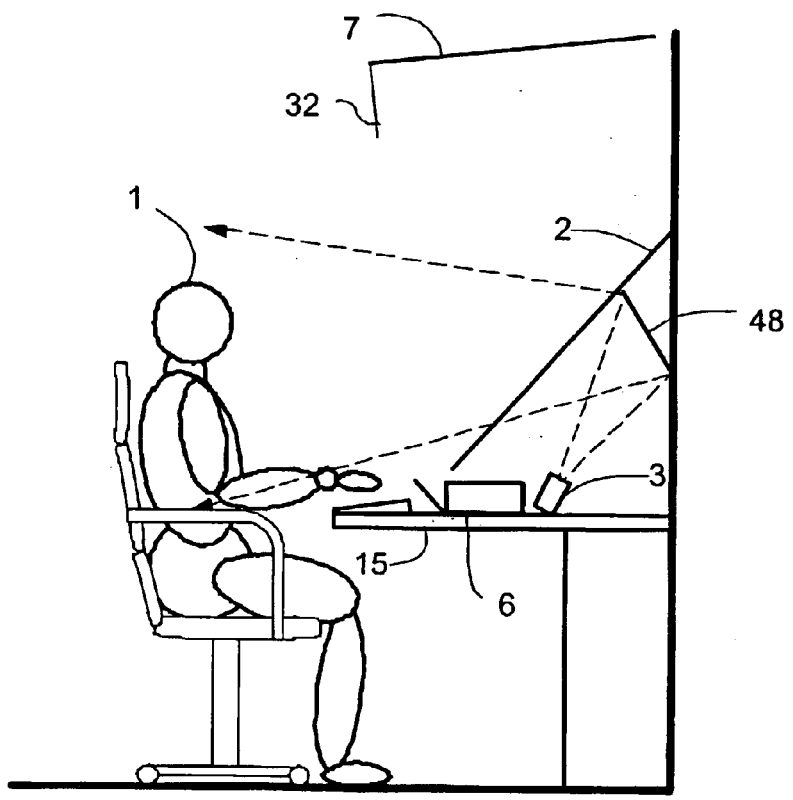
FIG. 45 illustrates a desktop system with a camera a mirror in the camera line of sight to extend the viewing distance.

FIG. 45 shows the above embodiment of the present invention with a camera 3 viewing the user 1 by way of a mirror 48 within the line of sight. The mirror 48 makes it possible to have a longer viewing distance so that the user 1 is not distorted from appearing to be too close to the camera 3.

Figure 46:
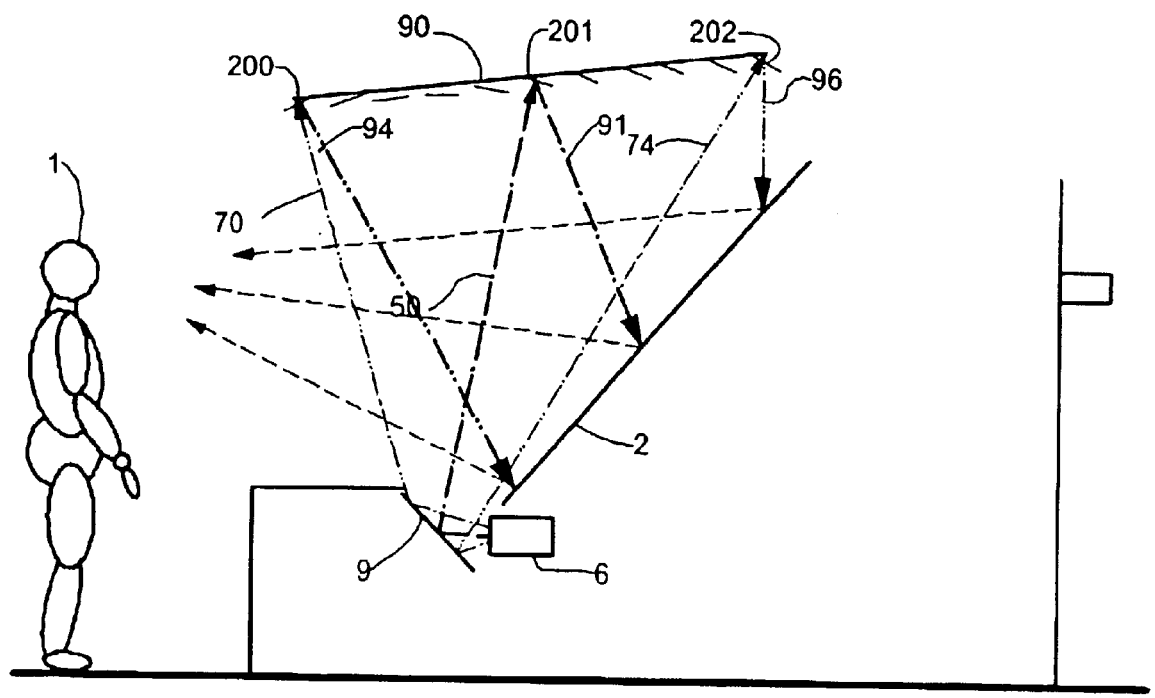
FIG. 46 shows an embodiment of the present invention incorporating a screen with a fresnal patterned surface.
Figure 47:
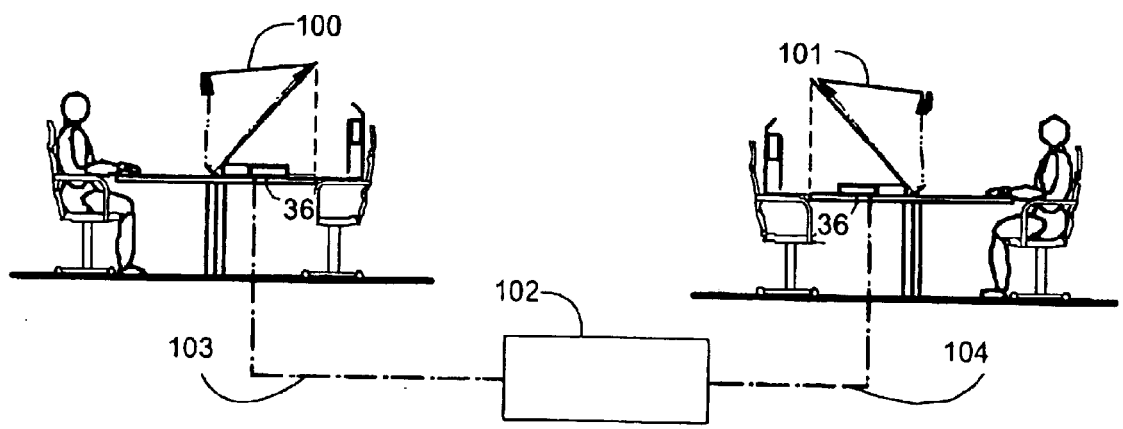
FIG. 47 shows an embodiment of the present invention where two systems are communicably coupled by a network connection.

FIG. 46 shows an embodiment of the present invention where the surface of the screen 90 is a fresnel patterned reflective surface (see e.g., reflective elements 200, 201, 202 in FIG. 46). FIG. 47 is an embodiment of the resent invention where a first communication system 100 is communicably coupled to a second, remote communication system 101 via network connections 103, 104 through a network 102 e.g., the Internet, WAN, LAN).

An advantage of an embodiment of the present invention is that it may achieve the appearance of images superimposed within a three dimensional setting and with a configuration that requires less bulk than previous configurations. Another advantage of an embodiment of the present invention is that it may achieve a large display image without projecting light through the two-way mirror 2, which would diminish the quality of the displayed image 10. Yet another advantage of an embodiment of present invention is that the position of the front surface screen 7 is above the two-way mirror 2 so that overhead lighting will not be cast upon the screen surface 7. Another advantage of the present invention is that it is possible to have an embodiment that will display life-size images of people and/or a full-size image of a vehicle on a stage with a front projection screen positioned above the stage where it will not be in the line of sight of users or an audience. Still another advantage of the present invention is that some or all of the configurations can position a camera in the line of sight of the displayed life-size image of a person so that the captured image can be transmitted to the remote location of the presenter for display in a similar system with a two-way mirror to achieve an apparent eye-to-eye contact during communication.

A further advantage of the present invention is that it is possible to provide an embodiment that could be integrated into a table or desk for usage for both normal meeting situations and could be transformed into a communications device for displaying life-size images. Another advantage of the present invention is that it is possible to provide an embodiment that could be used for commercial applications where the display device would be positioned above a promotional display and a life-size image of a live person could appear for offering help or for completing a commercial transaction, such as a payment for goods or completion of a financial transaction. Yet another advantage of the present invention is that it is possible to provide an embodiment for usage in a retail application where the visual display device is positioned above shelving, which could be used for displaying products, for example.

Another advantage of this present invention is that it is possible to provide an embodiment that will display a head-to-toe image of people within a three dimensional setting for entertainment and commercial applications. Still another advantage of the present invention is that it is possible to provide an embodiment that could be placed on a table or desk for usage and then could be folded into a compact form to become a portable system. A further advantage of an embodiment of the present invention is that a concave screen or a screen surface with a lenticular and/or fresnel pattern could achieve an improved image that is brighter and more evenly illuminated than standard front projection screens.

Another advantage of the present invention is that it could achieve the visual effect of displaying a life-size person with a perceived eye contact in a configuration that could be placed on a standard desk, table or work surface with a minimum of depth required.

It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. An image projection system for displaying images to a user located in an observation zone, comprising:
    a projector adapted to output a projected image along an image beam path, the image path being directed towards the observation zone during use of the system;
    a reflective mirror positioned between the projector and the observation zone, the reflective mirror having an upward-facing reflection surface;
    a front projection screen having a downward-facing projection surface located in a plane above the projector, wherein the upward-facing reflection surface of the reflective mirror is positioned so that the image beam path of the projected image from the projector is reflected off of the upward-facing reflection surface and upward toward the downward-facing projection surface of the front projection screen during use of the system, and wherein the image beam path impinges upon and illuminates the downward-facing projection surface of the screen during use of the system; and
    a two-way mirror located adjacent to and at an angle relative to the projection surface such that when the image from the projector is displayed on the projection surface of the screen, the image displayed on the screen is reflected to the observation zone, and wherein the image beam path of the projected image does not cross through the two-way mirror as the projected image travels from the projector to the front projection screen during use of the system.

2. The image projection system of claim 1, wherein the image beam path from the projector is substantially parallel with a horizontal plane.

3. The image projection system of claim 1, wherein the system is adapted to be foldable and portable.

4. The image projection system of claim 1, wherein the system is adapted to be folded and concealed within furniture.

5. The image projection system of claim 1, wherein the projector uses optical offsetting to correct for keystoning.

6. The image projection system of claim 1, wherein the projector is adapted to digitally distort the image before projection to adjust the image for corrected viewing of the image from the observation zone.

7. The image projection system of claim 1, wherein the surface of the screen is a fresnel patterned reflective surface.

8. The image projection system of claim 1, wherein the two-way mirror comprises plastic material having optical properties of partial reflection and transmission.

9. A communication system for allowing a user located in an observation zone to communicate with a person using a remote system at a remote location, the communication system comprising:
    a projector adapted to output a projected image along an image beam path, the image path being directed towards the observation zone during use of the system;
    a reflective mirror positioned between the projector and the observation zone, the reflective mirror having an upward-facing reflection surface;
    a front projection screen having a downward-facing projection surface located in a plane above the projector, wherein the upward-facing reflection surface of the reflective mirror is positioned so that the image beam path of the projected image from the projector is reflected off of the upward-facing reflection surface and upward toward the downward-facing projection surface of the front projection screen during use of the system, and wherein the image beam path impinges upon and illuminates the downward-facing projection surface of the screen during use of the system;
    a two-way mirror located adjacent to and at an angle relative to the projection surface such that when the image from the projector is displayed on the projection surface, the projected image is reflected to the observation zone, and wherein the image beam path of the projected image does not cross through the two-way mirror as the projected image travels from the projector to the front projection screen during use of the system; and
    a camera located behind the two-way mirror, such that the two-way mirror is located between the camera and the observation zone.

10. The communication system of claim 9, wherein the image beam path from the projector is substantially parallel with a horizontal plane.

11. The communication system of claim 9, further comprising:
a microphone adapted to receive sound from the observation zone; and
a speaker adapted to output sound to the observation zone.

12. The communication system of claim 9, wherein, during use of the system, the user has a line of sight aimed at eyes of the remote person's image, and the camera being substantially aligned with the line of sight so that when the user looks at the eyes of the remote person's image, the user will also be looking into the camera.

13. The communication system of claim 9, further comprising an illuminated three dimensional setting located between the two-way mirror and the camera.

14. The communication system of claim 9, wherein, during use of the system, the remote person's image presented to the user located in the observation zone comprises a life-size image of the remote person.

15. The communication system of claim 9, further comprising a network connection communicably coupling he communication system to the remote system at the remote location.

16. The communication system of claim 9, wherein the projector uses optical offsetting to correct for keystoning.

17. The communication system of claim 9, wherein the surface of the screen is a fresnel patterned reflective surface.

18. The communication system of claim 9, further comprising a dark-colored and illuminated three dimensional setting located behind the two-way mirror that is visible from the observation zone.

19. The communication system of claim 18, wherein the projected image comprises a black background behind an object, wherein the object does not extend beyond the borders of the projected image on at least three sides of the projected image so that the borders of the image are not noticeable to the user from the observation zone and so that the object in the projected image appears to be floating within a space behind the two-way mirror.

20. A communication system for displaying images of a remotely-located person to a user located in an observation zone and for allowing the user to visually and audibly communicate with the remotely-located person, comprising:
a counter located adjacent the observation zone;
an image projector located at the counter, the projector being adapted to output a projected image along an image beam path, being directed towards the observation zone during use of the system;
a reflective mirror positioned between the projector and the observation zone, the reflective mirror having an upward-facing reflection surface;
a front projection screen hang a downward-facing projection surface located in a plane above the projector, wherein the upward-facing reflection surface of the reflective mirror is positioned so that the image beam path of the projected image from the projector is reflected off of the upward-facing reflection surface and upward toward the downward-facing projection surface of the front projection screen during use of the system, and wherein the image beam path impinges upon and illuminates the downward-facing projection surface of the screen during use of the system;
a two-way mirror located adjacent to and at an angle relative to the projection surface such that when the image from the projector is displayed on the projection surface of the screen, the image displayed on the screen is reflected to the user in the observation zone, and wherein the image beam path of the projected image does not cross through the two-way mirror as the projected image travels from the projector to the front projection screen during use of the system;
a camera located behind the two-way mirror, such that the two-way mirror is located between the camera and the observation zone, and the camera being adapted to receive an image of the user;
a microphone adapted to receive sound from the observation zone; and
a speaker adapted to output sound to the observation zone.

21. The communication system of claim 20, further comprising a shelving structure located below the counter and opening to the observation zone so that the user may access items from the shelving structure while in the observation zone.

22. The communication system of claim 20, further comprising a product dispensing device adapted to controllably output a product to the user in the observation zone.

23. The communication system of claim 20, further comprising a payment acceptance device adapted to receive payment from the user in the observation zone.

24. A foldable communication system for allowing a user located in an observation zone to communicate with a person using a remote system at a remote location, the system having a closed folded configuration and an operable unfolded configuration, the system comprising:
a base;
an image projector attached to the base, the projector being adapted to output a projected image along an image beam path, the image path being directed towards the observation zone during use of the system;
a reflective mirror attached to the base, the reflective mirror being positioned between the projector and the observation zone during use of the system, and the reflective mirror having an upward-facing reflection surface when in the operable unfolded configuration;
a two-way mirror pivotably coupled to at least one of the base and the projector,
a front projection screen pivotably coupled to at least one of the two-way mirror and the base, the front projection screen having a projection surface;
a camera frame pivotably coupled to the base; and
a camera attached to the camera frame,
wherein in the operable unfolded configuration, the projector, the image beam path, the two-way mirror, the projection surface of the front projection screen, the camera frame, and the camera are positioned relative to each other and relative to the observation zone such that
the front projection screen is located in a plane above the projector,
the projection surface faces generally downward toward the base,
the upward-facing reflection surface of the reflective mirror is positioned so that the image beam path of the projected image from the projector is reflected off of the upward-facing reflection surface and upward toward the downward-facing projection surface of the front projection screen during use of the system,
the image beam path from the projector impinges upon and illuminates the projection surface of the screen during use of the system, the two-way mirror is positioned at an angle relative to the projection surface of the screen, wherein the image displayed on the downward-facing projection surface of the screen is reflected off of the two-way mirror to the observation zone, and wherein the image beam path of the projected image does not cross through the two-way mirror as the projected image travels from the projector to the front projection screen during use of the system, and the camera is positioned to receive images of objects in the observation zone through the two-way mirror, and wherein in the closed folded configuration, the system occupies less space in at least one direction than when the system is the operable unfolded configuration.

25. The communication system of claim 24, wherein the reflective mirror is hinged directly to the base.

26. The communication system of claim 24, further comprising a camera reflective mirror pivotably coupled to at least one of the camera frame and the camera, wherein in the operable unfolded configuration, the camera reflective mirror being positioned at an angle relative to the camera so that the camera receives images from the observation zone via the camera reflective mirror.

27. The communication system of claim 24, wherein the screen is hinged directly to two-way mirror.

28. The communication system of claim 24, wherein the surface of the screen is a fresnel patterned reflective surface.

29. The communication system of claim 24, wherein the system is portable in the closed folded configuration.

30. The communication system of claim 24, wherein the system is adapted to be concealed within furniture when in the closed folded configuration.

* * * * *